United States Patent Office
3,364,203
Patented Jan. 16, 1968

3,364,203
6,7-METHYLENE AND 6,7-HALOMETHYLENE PYRAZOLE PREGNANES AND PROCESSES FOR THEIR PREPARATION
Colin C. Beard, Boulder, Colo., and Alexander D. Cross, Mexico City, Mexico, assignors to Syntex Corporation, Panama, Panama, a corporation of Panama
No Drawing. Continuation-in-part of applications Ser. No. 486,226, Sept. 9, 1965, Ser. No. 499,091 and Ser. No. 499,092, Oct. 20, 1965. This application Apr. 11, 1967, Ser. No. 634,412
20 Claims. (Cl. 260—239.5)

ABSTRACT OF THE DISCLOSURE 6,7-methylene-, 6,7-monohalomethylene-, and 6,7-dihalomethylenepregn-4-eno - [3,2-c] - pyrazoles optionally containing hydrogen, methyl, chloro, or fluoro at C–6, and/or hydrogen, chloro, or fluoro at C–9, and/or hydrogen, hydroxy, keto, or chloro at C–11, and/or hydrogen, methylene, methyl, chloro, fluoro, hydroxy, or acyloxy at C–16, and/or hydrogen, hydroxy, or acyloxy at C–17, and/or alkylidenedioxy at C–16,17, and/or hydrogen, fluoro, chloro, phosphato, tetrahydropyranyl, tetrahydrofuranyl, or acyloxy at C–21, and/or an ortho ester grouping at C–17,21, which compounds exhibit corticoid and anti-inflammatory activity and processes for the preparation of such compounds.

---

This is a continuation-in-part of Ser. No. 486,226, filed Sept. 9, 1965, Ser. No. 499,091, filed Oct. 20, 1965, now abandoned, and Ser. No. 499,092; filed Oct. 20, 1965.

The present invention relates to novel organic compounds and, in particular, to pyrazole steroids of the pregnane series having a cyclopropyl or halocyclopropyl ring fused to the C–6,7 position of the molecule as represented by the following skeletal Formula A in which, for convenience and simplicity, only the novel grouping is depicted, the wavy line denoting and including both the alpha and beta configurations and each of X and Y being hydrogen, chloro, or fluoro:

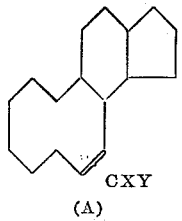

(A)

Specifically, this invention is directed at compounds which are diagrammatically represented by Formula B below:

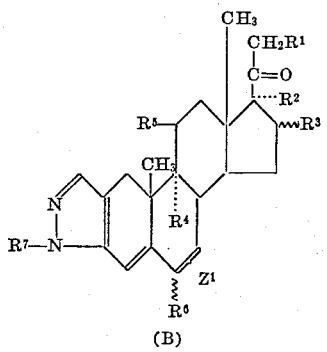

(B)

wherein $R^1$ is hydrogen, hydroxy, fluoro, chloro, phosphato (including mono and dialkali metal salts thereof), tetrahydropyran-2-yloxy, tetrahydrofuran-2-yloxy, or a hydrocarbon carboxylic acyloxy group of less than 12 carbon atoms;

$R^2$ is hydrogen, hydroxy, a hydrocarbon carboxylic acyloxy group of less than 12 carbon atoms, or when taken together with R, one of groups

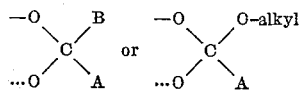

in which A is hydrogen or alkyl or less than 8 carbon atoms and B is hydrogen, or an alkyl or aryl group of up to 8 carbon atoms;

$R^3$ is hydrogen, methylene, α-methyl, β-methyl, α-chloro, α-fluoro, α-hydroxy, an α-hydrocarbon carboxylic acyloxy group of less than 12 carbon atoms, or, when taken together with $R^2$, the group

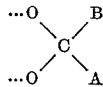

in which A is hydrogen or alkyl of up to 8 carbon atoms and B is hydrogen, or alkyl or aryl of up to 8 carbon atoms;

$R^4$ is hydrogen, chloro, or fluoro;
$R^5$ is hydrogen, hydroxy, keto, or chloro, $R^4$ and $R^5$ being the same when $R^5$ is hydrogen or chloro;
$R^6$ is hydrogen, chloro, fluoro, or methyl;
$R^7$ is hydrogen, phenyl, chlorophenyl, fluorophenyl, methoxyphenyl, or methylphenyl; and
$Z^1$ is the group

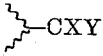

in which each of X and Y is hydrogen, chloro, or fluoro.

In the foregoing formulas and in those which follow, the wavy line ($\xi$) denotes and includes both the alpha and beta configurations.

The hydrocarbon carboxylic acyl and acyloxy groups of the present invention which are referred to in the above definitions contain less than 12 carbon atoms and can possess a straight, branched, cyclic or cyclic-aliphatic chain structure which is satrated, unsaturated, or aromatic and optionally substituted by functional groups, such as hydroxy, alkoxy containing up to 5 carbon atoms, acyloxy containing up to 12 carbon atoms, nitro, amino, halogeno, and the like. Typical conventional esters thus include acetate, propionate, enanthate, benzoate, trimethylacetate, t-butylacetate, phenoxyacetate, cyclopentylpropionate, aminoacetate, β-chloropropionate, adamantoate, and the like.

The foregoing compounds demonstarte hormonal properties characteristic of corticoids and exhibit antiinflammatory activity. They are useful in the treatment of conditions generally responsive to such agents, such as contact dermatitis, allergic reactions, and the like. They are administered in accordance with this activity via any of the normally employed routes including oral, parenteral, and topical administrations.

For such administrations, the compounds can be suitably formed into a pharmaceutically acceptable non-toxic composition via the incorporation of any of the usually employed excipients taking the form of powders, capsules, pellets, pills, solutions, creams, ointments, aerosols, and so forth. In addition, they can be administered in conjunction with other medicinal agents depending upon the specific condition being treated.

In administering these compounds, a convenient daily dosage regimen which can be adjusted according to the degree of affliction is employed. Most conditions respond well to treatment in the order of magnitude usually employed in the case of other compounds so used; that is, via a daily dosage unit of from 0.001 mg. to 10 mg. per kg. of body weight, the remainder being an inert vehicle or combination thereof.

A preferred class of these compounds is represented by the following Formula C:

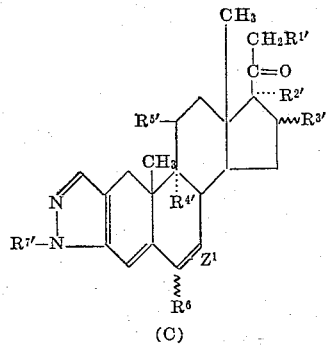

wherein each of $R^6$ and $Z^1$ is as hereinbefore defined;

$R^{1'}$ is hydroxy or fluoro;

$R^{2'}$ is hydrogen, hydroxy, or a hydrocarbon carboxylic acyloxy group of less than 12 carbon atoms;

$R^{3'}$ is a α-methyl or, when taken together with $R^{2'}$, the group

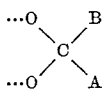

A and B being as previously defined;

$R^{4'}$ is hydrogen or fluoro;

$R^{5'}$ is hydrogen or hydroxy, $R^{4'}$ and $R^{5'}$ being the same when $R^{5'}$ is hydrogen; and $R^{7'}$ is hydrogen, phenyl, chlorophenyl, or fluorophenyl.

The compounds of this invention are prepared according to the following reaction scheme:

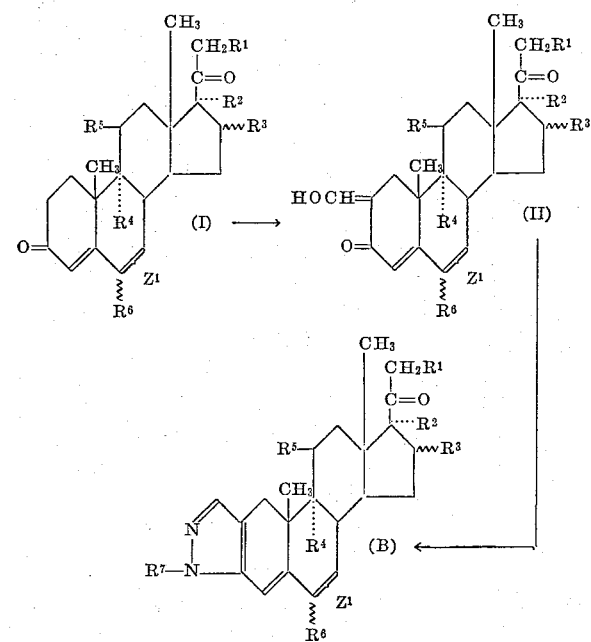

wherein each of $R^1$, $R^2$, $R^3$, $R^4$, $R^5$, $R^6$, $R^7$, and $Z^1$ is as hereinbefore defined.

With reference to the above scheme, upon treating starting Compounds (I) with ethyl formate and sodium hydride the corresponding 2-hydroxymethylene Compounds (II) are prepared. Treatment of these compounds with a hydrazine of the formula $NH_2NHR^7$, $R^7$ being as previously defined, under an inert atmosphere, such as is provided by nitrogen, and at elevated temperatures, such as at the temperature of refluxing ethanol, furnishes the product 4-pregneno-[3,2-c] pyrazoles hereof, B.

In the foregoing preparative processes, the side chain of the starting compound is preferably protected, particularly for the pyrazole formation step, in a fashion appropriate for the particular substitution present, as through formation of acetates or tetrahydropyranyl ethers of hydroxy groups, ketals of ketones, and the like. For those compounds bearing the 17α,21-dihydroxy-20-keto system, the preferred protection is the 17α,20;20,21-bis-methylenedioxy group. An 11β-hydroxy group is preferably oxidized to a keto group prior to the above transformation, particularly when $R^4$ is chloro or fluoro, this keto group being subsequently reduced, as with sodium borohydride in pyridine and aqueous isopropanol after pyrazole formation but before hydrolysis of the bis-methylenedioxy derivative. When free hydroxy groups are neither oxidized nor protected during the formation of the 2-hydroxymethylene, any formate ester which may form should be hydrolyzed after pyrazole formation through treatment with sodium methoxide in methanol at room temperature for about ten minutes. When $R^3$ is hydroxy, the 2-hydroxymethylene function and pyrazole ring can be introduced in a 16α,17α-alkylidenedioxy-21-tetrahydropyranyloxy derivative. After formation of the pyrazole ring in the manner described above and hydrolysis of any 11 formate with sodium methoxide, the 21-hydroxy group is regenerated through treatment with acid, such as p-toluenesulfonic acid.

When $R^7$ is other than hydrogen, a mixture of varying amounts of the 2'-substituted pregneno-[3,2-c] pyrazoles, represented by Formula B above, and 1'-substituted pregneno-[3,2-c] pyrazoles, is often obtained, the two components being separated by chromatography, fractional crystallization, or similar known methods.

Thereafter, hydrolysis, if desired, of any present protecting groups, such as the bismethylenedioxy group, with formic acid or hydrofluoric acid then yields the corresponding hydrolyzed compounds of Formula B.

The 3-keto-Δ⁴-6,7-methylene or -halomethylene starting compounds of the above scheme are prepared according to the methods set forth in U.S. Ser. No. 486,226, filed Sept. 9, 1965, Ser. No. 499,091, filed Oct. 20, 1965, now abandoned, and Ser. No. 499,092, filed Oct. 20, 1965, and, in addition, Ser. No. 634,411, filed on even date herewith. Briefly, for those compounds in which at least one of X and Y is chloro or fluoro, a 3-keto-Δ⁴,⁶-pregnadiene (obtainable from the corresponding Δ⁴-ene by treatment with chloranil in the presence of ethyl acetate and acetic acid) is treated with an alkali metal or alkaline earth metal salt of an acid of the formula

W—CXY—COOH in which W is chloro, bromo, or iodo, and X and Y are as above defined, with at least one of X or Y being chloro or fluoro, such as bromochloroacetic acid, dichloroacetic acid, trichloroacetic acid, chlorofluoroacetic acid, dichlorofluoroacetic acid, chlorodifluoroacetic acid, and the like. The process is conducted at a temperature above that at which the salt decomposes, as evidenced by the evolution of carbon dioxide, and in the presence of an inert, anhydrous polar organic solvent, such as dimethyl diethylene glycol ether, s-dimethoxyethane, dimethyl triethylene glycol ether, and the like. In practice, it is also desirable to protect hydroxy groups through the utilization of derivatives which are easily convertible to hydroxy groups, such as esters and tetrahydropyranyl ethers. This preference is not an absolute necessity however, for while free hydroxy groups will often become involved in side reactions under the conditions of the process, they can be readily regenerated by execution of a mild alkaline hydrolysis after completion of the principal reaction.

In the case where each of X and Y is hydrogen, a 6,7-chloromethylene or 6,7-dichloromethylene group of the present invention, introduced as outlined above, is reductively dehalogenated as with lithium aluminum hydride in organic solvent. Such a dehalogenation should be followed by an oxidation to regenerate any keto groups, which when unprotected are reduced during the treatment with lithium aluminum hydride. Thus, for example, a 3-keto-6,7-dichloromethylenepregn-4-ene is first reductively dehalogenated to a 3-hydroxy-6,7-methylenepregn-4-ene which upon treatment with 2,3-dichloro-5,6-dicyanobenzoquinone yields the corresponding 3-keto-6,7-methylenepregn-4-ene.

Alternatively, compounds wherein each of X and Y is hydrogen are directly generated by the action of dimethylsulfoxonium methylide in dimethylsulfoxide on a 3-keto-$\Delta^{4,6}$-diene.

The addition of the methylene, monohalomethylene, and dihalomethylene groups in accordance with the procedures set forth herein at position C-6,7 is accomplished with the orientation of the resultant fused grouping including both isomeric alpha and beta configurations in variable ratios. The isomeric product mixture in each instance is conveniently and readily subjected to conventional techniques, such as chromatography, fractional crystallization, and the like, by which the alpha and beta isomers are separated by virtue of their different physical properties. Each isomer or isomeric mixture can thereafter be subjected to further elaboration as desired at other parts of the molecule as hereinafter set forth.

In some instances, one particular configurational isomer predominates in the reaction mixture. Thus, for example, the presence of an 11$\beta$-hydroxyl orients the C-6,7-methylene group predominantly to the beta configuration, but does not alter the usual alpha to beta ratio in the halomethylene series. Beta addition in the halomethylene series is favored by the presence of a 9$\alpha$-halo substituent.

It will be understood that each of the isomers in each series is included within the scope of this invention.

In the preferred embodiment of this invention, compounds possessing the 17$\alpha$,21-dihydroxy-20-keto substituents are protected prior to the introduction of the 6,7-methylene or -halomethylene group through formation of the 17$\alpha$20;20,21-bismethylenedioxy derivative according to conventional procedures, such as with formaldehyde in the presence of acid. When R³ is hydroxy, protection may alternatively be realized through formation of the 16$\alpha$,17$\alpha$-isopropylidenedioxy-21-tetrahydropyranyloxy derivative.

A substituent in the 6-position, represented by R⁶, will be present in the starting material. Those substituents represented by R⁴ and R⁵ may be present in the starting material or may be subsequently introduced via the conventional procedures. Thus, an 11$\beta$-hydroxy compound is dehydrated to yield the $\Delta^{9(11)}$-ene. This is converted to the 9$\beta$,11$\beta$-oxido compound through the bromohydrin intermediate. Treatment of the oxide with hydrogen fluoride or hydrogen chloride then yields the 9$\alpha$-fluoro-11$\beta$-hydroxy or 9$\alpha$-chloro-11$\beta$-hydroxy compounds. Alternatively, the $\Delta^{9(11)}$-ene is treated with chlorine to yield the 9$\alpha$,11$\beta$-dichloro compound.

With the exception of methylene, the substituents represented by R³ are present in the starting material, as qualified above when R³ is hydroxy. The 16-methylene substituent is introduced after the methylene and halomethylene addition by formation of the 3,20-bis semicarbazone and treatment with acetic acid and pyruvic acid to yield the 3,20-diketo-$\Delta^{16}$-ene. Treatment of this compound with diazomethane and pyrolysis to produce the corresponding 16-methyl-$\Delta^{16}$-ene, epoxidation as with perbenzoic acid, and ring opening with hydrogen bromide in acetic acid.

Although starting compounds for the above procedure by which the pyrazole grouping is introduced are generally chosen which already contain any desired elaboration at other parts of the molecule, as mentioned above, the various groupings can be introduced subsequently as follows:

Treatment of the 17$\alpha$,21-dihydroxy-20-ketopregn-4-eno-[3,2-c]-pyrazoles of Formula B with mesyl chloride and subsequent treatment of the resulting 21-mesyloxy derivative with sodium iodide yields the corresponding 21-iodo derivative. Treatment of the 21-iodo intermediate with sodium metabisulfite yields the 21-unsubstituted compound (R¹=H). Replacement of the iodine atom with chloro or fluoro, as by the action of silver chloride or silver fluoride, respectively, yields the corresponding 21-chloro or 21-fluoro compounds.

In those cases wherein R⁷ is hydroxy, it is generally preferable during the foregoing formation of a 21-mesylate to acylate in the 2'-position. This acylation is executed on the protected bismethylenedioxy derivatives and the resulting N-acyl compound is then treated with formic acid or hydrofluoric acid is previously described to yield the N-acyl derivatives of the 17$\alpha$,21-dihydroxy-20-ketopregn-4-eno-[3,2-c]-pyrazoles. The N-acyl group is then removed by the action of an organic acid, such as acetic acid. In addition, when R³ is hydroxy, this group is protected during formation of a 21-mesylate, either through formation of a 16$\alpha$-acylate, for example, 16$\alpha$-acetoxy derivative, or through formation of a 16$\alpha$,17$\alpha$-ketal, for example, 16$\alpha$,17$\alpha$-isopropylidenedioxy derivative. Tetrahydropyran-2-yloxy and tetrahydrofuran-2-yloxy groups are introduced by treating the hydroxy compound with dehydropyran or dihydrofuran, respectively, in the presence of an arylsulfonic acid derivative catalyst.

The 21-iodo derivatives may also be treated with silver phosphate and phosphoric acid to form the 21-dihydrogenphosphato derivative which may be titrated with an alkali metal hydroxide or methoxide to yield the mono and dialkali metal salts thereof.

The 17$\alpha$,21-dihydroxy-20-ketopregn-4-eno-[3,2-c]-pyrazoles may be treated with an acylating agent, such as an acid anhydride or acid chloride, thereby introducing a hydrocarbon carboxylic acyloxy group in the 21-position. As in the case of the 21-mesylate, it is preferable where R⁷ is hydrogen to utilize an N-acyl starting material and to remove this acyl group after formation of the 21-acyloxy group.

Treatment of a 17$\alpha$,21-dihydroxy-20-ketopregn-4-eno-[3,2-c]-pyrazole with an alkyl ortho ester (alkyl orthoalkanoate) yields the corresponding 17$\alpha$,21-(1-alkoxyalk-1,1-ylidenedioxy) derivative. For example, by use of methyl orthovalerate one obtains the 17$\alpha$,21-(1-methoxypent-1,1-ylidenedioxy) derivative. Similarly, the corresponding 17$\alpha$,21-(1-alkoxyalk-1,1-ylidenedioxy) derivatives are formed by use of alternate alkyl orthoalkanoates, such as methyl orthoacetate, methyl orthopropionate, methyl orthovalerate, and the like.

Alternatively, treatment of a 17$\alpha$,21-dihydroxy-20-ketopregn-4-eno-[3,2-c]pyrazole with a ketone or aldehyde in the presence of a trace of acid yields the 17$\alpha$,21-alkylidenedioxy derivative.

The 16$\alpha$,17$\alpha$-alkylidenedioxy group, obtained by the action of a ketone or aldehyde in the presence of a trace of acid, may be formed for purposes of protection, as above, or may be utilized in final compounds. When used for protective purposes, it may be cleaved with formic acid or hydrofluoric acid to regenerate the 16$\alpha$,17$\alpha$-diol grouping.

The following examples will serve to further typify the nature of this invention. As these are presented solely for the purpose of illustration, they should not be construed as a limitation on the scope of this invention. In some instances for convenience, the various isomeric forms are specified; however, it will be understood that in any of the reaction steps both the alpha and beta isomers at C-6,7 are included within the scope hereof.

EXAMPLE 1

To a solution of 5 g. of 11β,17α,21-trihydroxy-16α-methylpregna-4,6-diene-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 11β-hydroxy-16α - methyl - 17α,20;20,21 - bismethylenedioxypregna - 4,6 - dien - 3 - one which is recrystallized from methanol:ether.

To a gently refluxing and stirred solution of 1 g. of 11β-hydroxy - 16α-methyl - 17α,20;20,21 - bismethylenedioxypregna-4,6-dien-3-one in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried, and chromatographed on alumina, eluting with methylene chloride to yield 6α,7α-difluoro-methylene-11β - hydroxy - 16α - methyl - 17α,20;20,21-bismethylenedioxypregn-4-en-3-one, M.P. 275–283° C., and 6β,7β-difluoro-methylene-11β-hydroxy-16α-methyl-17α,20;20,21-bismethylene-dioxypregn-4-en-3-one.

A solution of 6 g. of 6,7-difluoromethylene-11β-hydroxy - 16α-methyl-17α,20;20,21-bismethylenedioxypregn-4-en-3-one in 120 ml. of pyridine is added to a mixture of 6 g. of chromic trioxide in 20 ml. of pyridine. The reaction mixture is allowed to stand at room temperature for 15 hours, diluted with ethyl acetate, and filtered through Celite diatomaceous earth. The filtrate is washed well with water, dried, and evaporated to dryness to yield 6,7-difluoro-methylene-16α-methyl-17α,20;20,21-bismethylenedioxypregn-4-ene-3,11-dione which may be further purified by recrystallization from acetone:hexane.

To a stirred solution of 3 g. of 6α,7α-difluoro-methylene-16α-methyl-17α,20;20,21-bismethylenedioxypregn-4-ene-3,11-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum, and suspended in aqueous hydrochloric acid. This suspension is stirred at room temperature for half an hour and then filtered. The solid thus collected is washed with water and dried to yield 2-hydroxymethylene - 6α,7α-difluoromethylene-16α-methyl-17α,20;20,21-bismethylenedioxypregn-4-ene-3,11-dione which is recrystallized from methylene chloride:hexane.

Similarly, 2-hydroxymethylene - 6β,7β - difluoromethylene - 16α-methyl-17α,20;20,21-bismethylenedioxypregn-4-ene-3,11-dione is prepared from 6β,7β-difluoromethylene-16α - methyl-17α,20;20,21-bismethylenedioxypregn-4-ene-3,11-dione.

To a suspension of 1.23 g. of 2-hydroxymethylene-6α,7α - difluoromethylene-16α-methyl - 17α,20;20,21-bismethylenedioxypregn-4-ene-3,11-dione and 0.20 g. of sodium acetate in 25 ml. of ethanol is added under nitrogen, 0.245 g. of p-fluorophenylhydrazine hydrochloride. The mixture is heated at reflux under nitrogen for one hour and then evaporated to dryness. The residue is washed three times with 2.5 N hydrochloric acid, three times with 2.5 N sodium hydroxide, and finally with water, dried over magnesium sulfate, filtered, and evaporated to dryness in vacuo to yield a residue comprising 6α,7α - difluoromethylene-11-keto-16α-methyl-17α,20;20,21 - bismethylenedioxy-2'-(4-fluorophenyl) - pregn-4-eno-[3,2 - c] - pyrazole which may be recrystallized from methanol.

6β,7β-difluoromethylene-11-keto - 16α - methyl-17α,20; 20,21 - bismethylenedioxy - 2'(4 - fluorophenyl)-pregn-4-eno-[3,2-c]-pyrazole is similarly prepared from 2-hydroxymethylene - 6β,7β - difluoromethylene-16α-methyl-17α,20; 20,21-bismethylenedioxypregn-4-ene-3,11-dione.

A solution of 1 g. of sodium borohydride in 3 ml. of water is added to an ice-cooled solution of 1 g. of 6, 7-difluoromethylene-11-keto-16α-methyl - 17α,20;20,21 - bismethylenedioxy - 2' - (4 - fluorophenyl) - pregn-4-eno-[3,2—c]-pyrazole in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield 6α,7α-difluoromethylene - 11β - hydroxy-16α-methyl - 17α,20;20,21-bismethylenedioxy - 2' - (4 - fluorophenyl) - pregn-4-eno-[3,2—c]-pyrazole, M.P. 160–195° C., and the corresponding 6β,7β compound, which may be further purified by recrystallization from acetone:hexane.

A suspension of 1 g. of 6,7-difluoromethylene-11β-hydroxy - 16α - methyl - 17α,20;20,21 - bismethylenedioxy-2' - (4 - fluorophenyl) - pregn - 4 - eno - [3,2 - c] - pyrazole in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,7α-difluoromethylene - 11β,17α,21 - trihydroxy - 16α - methyl - 20 - keto-2' - (4 - fluorophenyl) - pregn - 4 - eno - [3,2 - c] - pyrazole, M.P. 233–236° C., and the 6β,7β compound, which may be further purified through recrystallization from isopropanol.

In like manner, use of 6,7-difluoromethylene-9α-fluoro-11β - hydroxy - 16α - methyl - 17α,20;20,21 - bismethylenedioxy-pregn-4-en-3-one affords 6α,7α-difluoromethylene - 9α - fluoro - 11β - hydroxy - 16α - methyl - 17α, 20;20,21 - bismethylenedioxy - 2' - (4 - fluorophenyl)-pregn-4-eno-[3,2-c]-pyrazole, [α]_D=−48°, and the corresponding 6β,7β isomer, M.P. 217–219° C., before hydrolysis and after hydrolysis, 6α,7α-difluoromethylene-9α-fluoro - 11β,17α,21 - trihydroxy - 16α - methyl - 2' - (4-fluorophenyl))-pregn-4-eno-[3,2-c]-pyrazole, M.P. 261–263° C., [α]_D=+30°, and the corresponding 6β,7β isomer, M.P. 237–240° C.

In a similar fashion, the following compounds are subjected to the foregoing procedure:

11β,17α,21-trihydroxypregna-4,6-diene-3,20-dione;
11β,17α,21-trihydroxy-16β-methylpregna-4,6-diene-3,20-dione;
11β,17α,21-trihydroxy-6-methylpregna-4,6-diene-3,20-dione;
11β,17α,21-trihydroxy-6,16α-dimethylpregna-4,6-diene-3,20-dione;
11β,17α,21-trihydroxy-6,16β-dimethylpregna-4,6-diene-3,20-dione;
6-fluoro-11β,17α,21-trihydroxypregna-4,6-diene-3,20-dione;
6-fluoro-11β,17α,21-trihydroxy-16α-methylpregna-4,6-diene-3,20-dione;
6-fluoro-11β,17α,21-trihydroxy-16β-methylpregna-4,6-diene-3,20-dione;
9α-fluoro-11β,17α,21-trihydroxy-16α-methylpregna-4,6-diene-3,20-dione;
9α-fluoro-11β,17α,21-trihydroxy-16β-methylpregna-4,6-diene-3,20-dione;

9α-chloro-11β,17α,21-trihydroxypregna-4,6-diene-3,20-dione;
9α-chloro-11β,17α,21-trihydroxy-16α-methylpregna-4,6-diene-3,20-dione;
9α-chloro-11β,17α,21-trihydroxy-16β-methylpregna-4,6-diene-3,20-dione;
6-methyl-9α-fluoro-11β,17α,21-trihydroxypregna-4,6-diene-3,20-dione;
6,16α-dimethyl-9α-fluoro-11β,17α,21-trihydroxypregna-4,6-diene-3,20-dione;
6,16β-dimethyl-9α-fluoro-11β,-17α,21-trihydroxypregna-4,6-diene-3,20-dione;
6-methyl-9α-chloro-11β,17α,21-trihydroxypregna-4,6-diene-3,20-dione;
6,16α-dimethyl-9α-chloro-11β,17α,21-trihydroxypregna-4,6-diene-3,20-dione;
6,16β-dimethyl-9α-chloro-11β,17α,21-trihydroxypregna-4,6-diene-3,20-dione;
6,9α-difluoro-11β,17α,21-trihydroxypregna-4,6-diene-3,20-dione;
6,9α-difluoro-11β,17α,21-trihydroxy-16α-methylpregna-4,6-diene-3,20-dione;
6,9α-difluoro-11β,17α,21-trihydroxy-16β-methylpregna-4,6-diene-3,20-dione;
6-fluoro-9α-chloro-11β,17α,21-trihydroxypregna-4,6-diene-3,20-dione;
6-fluoro-9α-chloro-11β,17α,21-trihydroxy-16α-methylpregna-4,6-diene-3,20-dione; and
6-fluoro-9α-chloro-11β,17α,21-trihydroxy-16β-methylpregna-4,6-diene-3,20-dione.

There are thus respectively obtained the following compounds:

6,7-difluoromethylene-11β,17α,21-trihydroxy-20-keto-2′-(4-fluorophenyl)-pregn-4-eno-[3,2-c]-pyrazole;
6,7-difluoromethylene-11β,17α,21-trihydroxy-16β-methyl-20-keto-2′-(4-fluorophenyl)-pregn-4-eno-[3,2-c]-pyrazole;
6,7-difluoromethylene-6-methyl-11β,17α,21-trihydroxy-20-keto-2′-(4-fluorophenyl)-pregn-4-eno-[3,2-c]-pyrazole;
6,7-difluoromethylene-6,16α-dimethyl-11β,17α,21-trihydroxy-20-keto-2′-(4-fluorophenyl)-pregn-4-eno-[3,2-c]-pyrazole;
6,7-difluoromethylene-6,16β-dimethyl-11β,17α,21-trihydroxy-20-keto-2′-(4-fluorophenyl)-pregn-4-eno-[3,2-c]-pyrazole;
6,7-difluoromethylene-6-fluoro-11β,17α,21-trihydroxy-20-keto-2′-(4-fluorophenyl)-pregn-4-eno-[3,2-c]-pyrazole;
6,7-difluoromethylene-6-fluoro-11β,17α,21-trihydroxy-16α-methyl-20-keto-2′-(4-fluorophenyl)-pregn-4-eno-[3,2-c]-pyrazole;
6,7-difluoromethylene-9α-fluoro-11β,17α,21-trihydroxy-20-keto-2′-(4-fluorophenyl)-pregn-4-eno-[3,2-c]-pyrazole;
6,7-difluoromethylene-9α-chloro-11β,17α,21-trihydroxy-20-keto-2′-(4-fluorophenyl)-pregn-4-eno-[3,2-c]-pyrazole;
6,7-difluoromethylene-9α-chloro-11β,17α,21-trihydroxy-16α-methyl-20-keto-2′-(4-fluorophenyl)-pregn-4-eno-[3,2-c]-pyrazole;
6,7-difluoromethylene-9α-chloro-11β,17α,21-trihydroxy-16β-methyl-20-keto-2′-(4-fluorophenyl)-pregn-4-eno-[3,2-c]-pyrazole;
6,7-difluoromethylene-6-methyl-9α-fluoro-11β,17α,21-trihydroxy-20-keto-2′-(4-fluorophenyl)-pregn-4-eno-[3,2-c]-pyrazole;
6,7-difluoromethylene-6,16α-dimethyl-9α-fluoro-11β,17α,21-trihydroxy-20-keto-2′-(4-fluorophenyl)-pregn-4-eno-[3,2-c]-pyrazole;
6,7-difluoromethylene-6,16β-dimethyl-9α-fluoro-11β,17α,21-trihydroxy-20-keto-2′-(4-fluorophenyl)-pregn-4-eno-[3,2-c]-pyrazole;
6,7-difluoromethylene-6-methyl-9α-chloro-11β,17α,21-trihydroxy-20-keto-2′-(4-fluorophenyl)-pregn-4-eno-[3,2-c]-pyrazole;
6,7-difluoromethylene-6,16α-dimethyl-9α-chloro-11β,17α,21-trihydroxy-20-keto-2′-(4-fluorophenyl)-pregn-4-eno-[3,2-c]-pyrazole;
6,7-difluoromethylene-6,16β-dimethyl-9α-chloro-11β,17α,21-trihydroxy-20-keto-2′-(4-fluorophenyl)-pregn-4-eno-[3,2-c]-pyrazole;
6,7-difluoromethylene-6,9α-difluoro-11β,17α,21-trihydroxy-20-keto-2′-(4-fluorophenyl)-pregn-4-eno-[3,2-c]-pyrazole;
6,7-difluoromethylene-6,9α-difluoro-11β,17α,21-trihydroxy-16α-methyl-20-keto-2′-(4-fluorophenyl)-pregn-4-eno-[3,2-c]-pyrazole;
6,7-difluoromethylene-6,9α-difluoro-11β,17α,21-trihydroxy-16β-methyl-20-keto-2′-(4-fluorophenyl)-pregn-4-eno-[3,2-c]-pyrazole;
6,7-difluoromethylene-6-fluoro-9α-chloro-11β,17α,21-trihydroxy-20-keto-2′-(4-fluorophenyl)-pregn-4-eno-[3,2-c]-pyrazole; and
6,7-difluoromethylene-6-fluoro-9α-chloro-11β,17α,21-trihydroxy-16β-methyl-20-keto-2′-(4-fluorophenyl)-pregn-4-eno-[3,2-c]-pyrazole.

If in the foregoing procedure there is employed in place of p-fluorophenylhydrazine hydrochloride, an equivalent amount of phenyl hydrazine hydrochloride, the corresponding 2′-phenylpregn-4-eno-[3,2-c]-pyrazoles are obtained. Notable among these are the following:

6α,7α-difluoromethylene-11β,17α,21-trihydroxy-16α-methyl-20-keto-2′-phenylpregn-4-enol[3,2-c]-pyrazole, M.P. 250–251° C., [α]$_D$=+26°;
6β,7β-difluoromethylene-11β,17α,21-trihydroxy-16α-methyl-20-keto-2′-phenylpregn-4-eno-[3,2-c]-pyrazole;
6,7-difluoromethylene-6,9α-difluoro-11β,17α,21-trihydroxy-16α-methyl-20-keto-2′-phenylpregn-4-eno-[3,2-c]-pyrazole;
6,7-difluoromethylene-6,9α-difluoro-11β,17α,2-trihydroxy-16α-methyl-20-keto-2′-phenylpregn-4-eno-[3,2-c]-pyrazole;
6,7-difluoromethylene-6-fluoro-11β,17α,21-trihydroxy-16α-methyl-20-keto-2′-phenylpregn-4-eno-[3,2-c]-pyrazole;
6,7-difluoromethylene-6,16α-dimethyl-11β,17α,21-trihydroxy-20-keto-2′-phenylpregn-4-eno-[3,2-c]-pyrazole;
6,7-difluoromethylene-9α-fluoro-11β,17α,21-trihydroxy-16β-methyl-20-keto-2′-phenylpregn-4-eno-[3,2-c]-pyrazole;
6,7-difluoromethylene-6,9α-difluoro-11β,17α,21-trihydroxy-16β-methyl-20-keto-2′-phenylpregn-4-eno-[3,2-c]-pyrazole;
6,7-difluoromethylene-11β,17α,21-trihydroxy-20-keto-2′-phenylpregn-4-eno-[3,2c-]-pyrazole; and
6,7-difluoromethylene-9α-fluoro-11β,17α,21-trihydroxy-20-keto-2′-phenylpregn-4-eno-[3,2-c]-pyrazole.

The corresponding 11β-desoxy compounds, such as 6,7-difluoromethylene - 16α - methyl - 20-keto-21-hydroxy-2′-(4-fluorophenyl)-pregn-4-eno-[3,2-c]-pyrazole and 6,7-difluoromethylene - 16α - methyl - 17α,21 - dihydroxy-20-keto-2′-(4-fluorophenyl)-pregn-4-eno-[3,2-c]-pyrazole are analogously prepared, eliminating the unnecessary oxidation step.

Alternatively, if an equivalent amount of hydrazine hydrate is utilized in the foregoing procedure, the corresponding 2′-unsubstituted pregn-4-eno-[3,2-c]-pyrazoles are obtained as the reaction product. Notable among these are the following:

6,7-difluoromethylene-11β,17α,21-hydroxy-20-ketopregn-4-eno-[3,2-c]-pyrazole;
6,7-difluoromethylene-9α-fluoro-11β,17α,21-trihydroxy-20-ketopregn-4-eno-[3,2-c]-pyrazole;

6,7-difluoromethylene-11β,17α,21-trihydroxy-16α-methyl-20-ketopregn-4-eno-[3,2-c]-pyrazole;
6,7-difluoromethylene-9α-fluoro-11β,17α,21-trihydroxy-16α-methyl-20-ketopregn-4-eno[3,2-c]pyrazole;
6,7-difluoromethylene-6-fluoro-11β,17α,21-trihydroxy-16α-methyl-20-ketopregn-4-eno-[3,2-c]-pyrazole;
6,7-difluoromethylene-6,9α-difluoro-11β,17a,21-trihydroxy-16α-methyl-20-ketopregn-4-eno-[3,2-c]-pyrazole;
6,7-difluoromethylene-6,16α-dimethyl-11β,17α,21-trihydroxy-20-ketopregn-4-eno-[3,2-c]-pyrazole;
6,7-difluoromethylene-6,16α-dimethyl-9α-fluoro-11β,17α,21-trihydroxy-20-ketopregn-4-eno-[3,2-c]-pyrazole;
6,7-difluoromethylene-9α-fluoro-11β,17α,21-trihydroxy-16β-methyl-20-ketopregn-4-eno-[3,2-c]-pyrazole; and
6,7-difluoromethylene-6,9α-difluoro-11β,17α,21-trihydroxy-16β-methyl-20-ketopregn-4-eno-[3,2-c]-pyrazole.

EXAMPLE 2

To a solution of 5g. of 9α,16α-difluoro-11β,17α,21-trihydroxypregn-4-ene-3,20-dione, obtained from 11β-hydroxy-20,21-oxidopregna-4,16-dien-3-one according to the procedures of Magerlein et al., J. Med. Chem., 7, 748 (1964), in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 9α,16α-difluoro-11β-hydroxy-17α,20;20,21-bismethylenedioxypregn-4-en-3-one which is recrystallized from methanol:ether.

A mixture of 1 g. of 9α16α-difluoro-11β-hydroxy-17α,20;20,21-bismethylenedioxypregn-4-en-3-one, 2 g. of chloranil, and 10 ml. of xylene is refluxed under an atmosphere of nitrogen for 16 hours. The mixture is cooled, washed with a cold 10% sodium hydroxide solution, and then with water, dried over sodium sulfate, and evaporated under reduced pressure. The residue is chromatographed on neutral alumina and further purified through recrystallization from acetone:hexane to yield 9α,16α-difluoro-11β-hydroxy-17α,20;20,21-bismethylenedioxypregna-4,6-dien-3-one.

Upon the treatment of 9α,16α-difluoro-11β-hydroxy-17α,20;20,21-bismethylenedioxypregna-4,6-dien-3-one with sodium chlorodifluoroacetate according to the procedure described in Example 1, there is obtained 6α,7α-difluoromethylene-9α,16α-difluoro-11β-hydroxy-17α,20;20,21-bismethylenedioxypregn-4-en-3-one and 6β,7β-difluoromethylene-9α,16α-difluoro-11β-hydroxy-17α,20;20,21-bismethylenedioxypregn-4-en-3-one. The individual compounds are then oxidized to the corresponding 3,11-dione and then treated with ethylformate and sodium hydride to yield 2-hydroxymethylene-6α,7α-difluoromethylene-9α,16α-difluoro-17α,20;20,21-bismethylenedioxypregn-4-ene-3,11-dione and the corresponding 6β,7β compound.

A solution of 1 g. of the individual compounds thus obtained in 40 ml. of absolute ethanol is added under nitrogen, 0.38 ml. of hydrazine hydrate. The mixture is quickly heated to reflux temperature under nitrogen. After refluxing for one hour, the mixture is taken to dryness. The residue is treated with water and collected by filtration. This solid is thoroughly washed with water and dried to yield 6α,7α-difluoromethylene-9α,16α-difluoro-11-keto-17α,20;20,21-bismethylenedioxypregn-4-eno-[3,2-c]-pyrazole and the corresponding 6β,7β compound.

A solution of 1 g. of sodium borohydride in 3 ml. of water is added to an ice-cooled solution of 1 g. of 6,7-difluoromethylene-9α,16α-difluoro-11-keto-17α,20;20,21-bismethylenedioxypregn-4-eno-[3,2-c]-pyrazole in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield 6,7-difluoromethylene-9α,16α-difluoro-11β-hydroxy-17α,20;20,21-bismethylenedioxypregn-4-eno-[3,2-c]-pyrazole, which may be further purified by recrystallization from acetone:hexane.

A suspension of 1 g. of 6,7-difluoromethylene-9α,16α-difluoro-11β-hydroxy-17α,20;20,21-bismethylenedioxypregn-4-eno-[3,2-c]-pyrazole, in 10 ml. of 48% aqueous hydrofluoric acid, is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,7α-difluoromethylene-9α,16α-difluoro-11β,17α,21-trihydroxy-20-ketopregn-4-eno-[3,2-c]-pyrazole, and the corresponding 6β,7β compound, which may be further purified through recrystallization from isopropanol.

In a similar fashion, the following compounds, obtained from known materials via the procedures of Magerlein et al., ibid, or Kagan et al., J. Med. Chem., 7, 751 (1964), are subjected to the procedure of this example.

11β,17α,21 - trihydroxy - 16α - fluoropregn - 4 - ene - 3,20-dione;
11β,17α,21 - trihydroxy - 16α - chloropregn - 4 - ene - 3,20-dione;
9α - fluoro - 11β,17α,21 - trihydroxy - 16α - chloropregn-4-ene-3,20-dione;
6α,9α - difluoro - 11β,17α,21 - hydroxy - 16α - chloropregn-4-ene-3,20-dione;
6α,9α,16α - trifluoro - 11β,17α,21 - trihydroxypregn - 4-ene-3,20-dione;
6α - methyl - 9α - fluoro - 11β,17α,21 - trihydroxy - 16α-chloropregn-4-ene-3,20-dione;
6α - methyl - 9α,16α - difluoro - 11β,17α,21 - trihydroxypregn-4-ene-3,20-dione;
6α,16α - difluoro - 11β,17α,21 - trihydroxypregn - 4 - ene-3,20-dione;
6α - fluoro - 11β,17α,21 - trihydroxy - 16α - chloropregn-4-ene-3,20-dione;
6α - methyl - 11β,17α,21 - trihydroxy - 16α - fluoropregn-4-ene-3,20-dione; and
6α - methyl - 11β,17α,21 - trihydroxy - 16α - chloropregn-4-ene-3,20-dione.

There are thus respectively obtained the following compounds:

6,7 - difluoromethylene - 11β,17α,21 - trihydroxy - 16α-fluoro-20-ketopregn-4-eno-[3,2-c]-pyrazole;
6,7 - difluoromethylene - 11β,17α,21 - trihydroxy - 16α-chloro-20-ketopregn-4-eno-[3,2-c]-pyrazole;
6,7 - difluoromethylene - 9α - fluoro - 11β,17α,21 - trihydroxy - 16α - chloro - 20 - ketopregn - 4 - eno - [3,2-c]-pyrazole;
6,7 - difluoromethylene - 6,9α - difluoro-11β,17α,21-trihydroxy - 16α - chloro - 20 - ketopregn - 4 - eno - [3,2-c]-pyrazole;
6,7 - difluoromethylene - 6,9α,16α - trifluoro - 11β,17α,21-trihydroxy - 20 - ketopregn - 4 - eno - [3,2-c] - pyrazole;
6,7-difluoromethylene - 6 - methyl - 9α - fluoro - 11β,17α,21 - trihydroxy - 16α - chloro - 20 - ketopregn - 4 - eno-[3,2-c]-pyrazole;
6,7-difluoromethylene - 6 - methyl - 9α,16α - difluoro - 11β,17α,21 - trihydroxy - 20 - ketopregn - 4 - eno - [3,2-c]-pyrazole;
6,7 - difluoromethylene - 6,16α - difluoro - 11β,17α,21 - trihydroxy-20-ketopregn-4-eno-[3,2-c]-pyrazole;
6,7 - difluoromethylene - 6 - fluoro - 11β,17α,21 - trihydroxy-16α-chloro-20-ketopregn-4-eno-[3,2-c]-pyrazole;
6,7 - difluoromethylene - 6 - methyl - 11β,17α,21 - trihydroxy - 16α - fluoro - 20 - ketopregn - 4 - eno - [3,2-c]-pyrazole; and 6,7 - difluoromethylene - 6 - methyl - 11β,17α,20-trihydroxy - 16α - chloro - 20 - ketopregn - 4 - eno - [3,2-c]-pyrazole.

Likewise, by the use of other hydrazines, such as o-, m-, and p-methylphenylhydrazine, o-, m-, and p-methoxyphenylhydrazine, o-, m-, and p - chlorophenylhydrazine, and -phenylhydrazine in place of hydrazine in the foregoing procedures there are obtained the corresponding pregn-4-eno-[3,2-c]-pyrazoles substituted in the 2'-position by o-methylphenyl, m-methylphenyl, p-methylphenyl, o-methoxyphenyl, m-methoxyphenyl, p-methoxyphenyl, o-chlorophenyl, m-chlorophenyl, p-chlorophenyl, or phenyl group, respectively.

EXAMPLE 3

To a solution of 5 g. of 9α,11β-dichloro-17α,21-dihydroxypregna-4,6-diene-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 9α,11β - dichloro - 17α,20;20,21 - bismethylene dioxypregna - 4,6 - dien-3-one which is recrystallized from methanol:ether.

To a refluxing solution of 1 g. of 9α,11β-dichloro-17α,20;20,21 - bismethylenedioxypregna - 4,6 - dien - 3 - one in 20 ml. of dimethyl diethylene glycol ether is added with stirring and in a dropwise fashion a 1:2 w./v. solution of sodium chlorodifluoroacetate in dimethyl diethylene glycol ether. The addition is stopped after the introduction of about five equivalents of reagent fails to substantially change the U.V. spectra. The mixture is then filtered and evaporated to dryness. The residue thus obtained is chromatographed on alumina with methylene chloride to yield 6α,7α - difluoro - methylene - 9α,11β - dichloro - 17α,20;20,21 - bismethylenedioxypregna - 4 - en - 3 - one and the corresponding 6β,7β compound.

To a stirred solution of 3 g. of 6α,7α-difluoromethylene - 9α,11β-dichloro - 17α,20;20,21 - bismethylenedioxypregn-4-en-3-one in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum, and suspended in aqueous hydrochloric acid. This suspension is stirred at room temperature for half an hour and then filtered. The solid thus collected is washed with water and dried to yield 2-hydroxymethylene-6α,7α - difluoromethylene - 9α,11β-dichloro - 17α,20;20,-21-bismethylenedioxypregn-4-en-3-one which is recrystallized from methylene chloride:hexane.

Similarly, 2-hydroxymethylene - 6β,7β-difluoromethylene - 9α,11β-dichloro - 17α,20;20,21-bismethylenedioxypregn-4-en-3-one is prepared from 6β,7β-difluoromethylene - 9α,11β-dichloro - 17α,20;20,21-bismethylenedioxypregn-4-en-3-one.

A solution of 0.66 g. of 2-hydroxymethylene-6α,7α-difluoromethylene - 9α,11β - dichloro - 17α,20;20,21 - bismethylenedioxypregn-4-en-3-one in 7 ml. of absolute ethanol is treated with 1.2 ml. of hydrazine hydrate. The mixture is refluxed under nitrogen for 45 minutes and then evaporated to dryness under reduced pressure to yield 6α,7α-difluoromethylene - 9α,11β - dichloro - 17α,20;20,-21-bismethylenedioxypregn - 4 - eno - [3,2-c] - pyrazole which may be recrystallized from chloroform:hexane.

Similarly, 6β,7β - difluoromethylene - 9α,11β - dichloro - 17α,20;20,21 - bismethylenedioxypregn - 4 - eno - [3,2-c]-pyrazole is prepared.

One gram of 6,7-difluoromethylene-9α,11β-dichloro-17α,20;20,21 - bismethylenedioxypregn - 4 - eno - [3,2-c]-pyrazole in 20 ml. of 60% formic acid is heated at steam bath temperature for one hour. The mixture is cooled, diluted with water, and filtered. The solid thus collected is washed with water, dried, and recrystallized from acetone:hexane to yield 6,7-difluoromethylene-9α,11β-dichloro-17α,21 - dihydroxy - 20 - ketopregn - 4 - eno - [3,2-c]-pyrazole.

In a similar fashion, the following compounds are subjected to the procedure of this example:

9α,11β-dichloro-17α,21-dihydroxy-16α-methylpregna-4,6-diene-3,20-dione;
9α,11β-dichloro-17α,21-dihydroxy-16β-methylpregna-4,6-diene-3,20-dione;
9α,11β-dichloro-6-fluoro-17α,21-dihydroxypregna-4,6-diene-3,20-dione;
9α,11β-dichloro-6-fluoro-17α,21-dihydroxy-16β-methyl-pregna-4,6-diene-3,20-dione;
9α,11β-dichloro-17α,21-dihydroxy-6-methylpregna-4,6-diene-3,20-dione;
9α,11β-dichloro-17α,21-dihydroxy-6,16α-dimethylpregna-4,6-diene-3,20-dione; and
9α,11β-dichloro-17α,21-dihydroxy-6,16β-dimethylpregna-4,6-diene-3,20-dione.

There are thus respectively obtained the following compounds:

6,7-difluoromethylene-9α,11β-dichloro-17α,21-dihydroxy-16α-methyl-20-ketopregn-4-eno-[3,2-c]-pyrazole;
6,7-difluoromethylene-9α,11β-dichloro-17α,21-dihydroxy-16β-methyl-20-ketopregn-4-eno-[3,2-c]-pyrazole;
6,7-difluoromethylene-6-fluoro-9α,11β-dichloro-17α,21-dihydroxy-20-ketopregn-4-eno-[3,2-c]-pyrazole;
6,7-difluoromethylene-6-fluoro-9α,11β-dichloro-17α,21-dihydroxy-16α-methyl-20-ketopregn-4-eno-[3,2-c]-pyrazole;
6,7-difluoromethylene-6-fluoro-9α,11β-dichloro-17α,21-dihydroxy-16β-methyl-20-ketopregn-4-eno-[3,2-c]-pyrazole;
6,7-difluoromethylene-6-methyl-9α,11β-dichloro-17α,21-dihydroxy-20-ketopregn-4-eno-[3,2-c]-pyrazole;
6,7-difluoromethylene-6-methyl-9α,11β-dichloro-17α,21-dihydroxy-16α-methyl-20-ketopregn-4-eno-[3,2-c]-pyrazole; and
6,7-difluoromethylene-6-methyl-9α,11β-dichloro-17α,21-dihydroxy-16β-methyl-20-ketopregn-4-eno-[3,2-c]-pyrazole.

Similarly, from 16α-methyl-17α,21-dihydroxypregna-4,6-diene-3,20-dione there is obtained according to this example, but using phenyl hydrazine, 6α,7α-difluoromethylene - 16α-methyl - 17α,20;20,21 - bismethylenedioxy - 2' - phenylpregn - 4 - eno - [3,2-c] - pyrazole, and the corresponding 6β,7β compound, and after hydrolysis, 6α,7α-difluoromethylene - 16α-methyl - 17α,21-dihydroxy - 20-keto-2'-phenylpregn - 4-eno-[3,2-c]-pyrazole, M.P. ca. 150° C., [α]$_D$=+44°, and the corresponding 6β,7β compound. Use of 4-fluorophenylhydrazine similarly yields 6α,7α - difluoromethylene-16α-methyl-17α,20;20,21 - bismethylenedioxy - 2'-(4-fluorophenyl)-pregn-4-eno-[3,2-c]-pyrazole, M.P. 287–289° C., [α]$_D$=—67°, and the corresponding 6β,7β compound, and after hydrolysis, 6α,7α - difluoromethylene - 16α - methyl - 17α,21 - dihydroxy - 20 - keto - 2' - (4-fluorophenyl) - pregn - 4 - eno-[3,2-c]-pyrazole, M.P. 144–156° C., [α]$_D$=+37°, and the corresponding 6β,7β compound.

EXAMPLE 4

To a refluxing solution of 1 g. of 9α-fluoro-11β-hydroxy-16α,17α-isopropylidenedioxy-21-tetrahydropyran-2-yloxypregna-4,6-diene-3,20-dione in 15 ml. of dimethyl diethylene glycol ether is added under nitrogen and in a dropwise fashion a 50% w./v. solution of sodium chlorodifluoroacetate in dimethyl diethylene glycol ether. When there is no change in the U.V. spectrum upon the addition of an excess of reagent, the addition and refluxing are discontinued. The reaction mixture is filtered and chromatographed on alumina with 3:1 hexane:methylene chloride to yield 6α,7α-difluoromethylene-9α-fluoro-11β-hydroxy-16α,17α-isopropylidenedioxy-21-tetrahydropyran-2-yloxypregn-4-ene-3,20-dione and the corresponding 6β,7β-difluoromethylene-9α-fluoro-11β-hydroxy-16α,17α-isopropylidenedioxy-21-tetrahydropyran-2-yloxypregn-4-ene-3,20-dione.

To a stirred solution of 3 g. of 6α,7α-difluoromethylene-9α - fluoro - 11β - hydroxy - 16α,17α - isopropylidenedioxy - 21 - tetrahydropyran - 2 - yloxypregn - 4 - ene-3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum, and suspended in aqueous hydrochloric acid. This suspension is stirred at room temperature for half an hour and then filtered. The solid thus collected is washed with water and dried to yield 2 - hydroxymethylene - 6α,7α - difluoromethylene - 9α - fluoro - 11β - hydroxy - 16α,17α - isopropylidenedioxy - 21 - tetrahydropyran - 2 - yloxypregn-4-ene-3,20-dione which is recrystallized from methylene chloride:hexane.

Similarly, 2 - hydroxymethylene - 6β,7β - difluoromethylene - 9α - fluoro - 11β - hydroxy - 16α,17α - isopropylidenedioxy - 21 - tetrahydropyran - 2 - yloxypregn - 4 - ene-3,20-dione is prepared from 6β,7β-difluoromethylene - 9α - fluoro - 11β - hydroxy - 16α,17α - isopropylidenedioxy - 21 - tetrahydropyran - 2 - yloxypregn - 4 - ene-3,20-dione.

A suspension of 1 g. of 2 - hydroxymethylene - 6α,7α-difluoromethylene - 9α - fluoro - 11β - hydroxy - 16α,17α-isopyropylidenedioxy - 21 - tetrahydropyran - 2 - yloxypregn - 4 - ene - 3,20 - dione in 20 ml. of ethanol is treated with 1.2 equivalents of sodium acetate and 1.2 equivalents of p-fluorophenylhydrazine hydrochloride. The mixture is refluxed under nitrogen for one hour, evaporated to dryness, and dissolved in ether. This ethereal solution is washed with dilute aqueous hydrochloric acid, dilute aqueous sodium hydroxide and water, dried over magnesium sulfate, and evaporated to dryness under reduced pressure. The residue is dissolved in 50 ml. of methanol and allowed to stand under nitrogen for ten minutes with 10 ml. of 1.33 N sodium methoxide in methanol. After neutralization with acetic acid, the mixture is diluted with ethyl acetate and washed with water. The organic solution is then dried over sodium sulfate and evaporated to dryness to yield 6α,7α - difluoromethylene - 9α - fluoro - 11β - hydroxy - 16α,17α - isopropylidenedioxy - 20 - keto - 21 - tetrahydropyran - 2 - yloxy - 2' - (4 - fluorophenyl)-pregn-4-eno-[3,2-c]-pyrazole.

Similarly, 6β,7β - difluoromethylene - 9α - fluoro - 11β-hydroxy - 16α,17α - isopropylidenedioxy - 20 - keto - 21-tetrahydropyran - 2 - yloxy - 2' - (4 - fluorophenyl)-pregn-4-eno-[3,2-c]-pyrazole is prepared.

To a solution of 1 g. of 6α,7α - difluoromethylene - 9α-fluoro - 11β - hydroxy - 16α,17α - isopyropylidenedioxy-20 - keto - 21 - tetrahydropyran - 2 - yloxy - 2' - (4 - fluorophenyl) - pregn - 4 - eno - [3,2-c] - pyrazole in 30 ml. of acetic acid is added 0.5 ml. of 2 N hydrochloric acid. The mixture is allowed to stand five hours at room temperature and then diluted with ice water and extracted with methylene chloride. The extracts are washed with water to neutrality, dried over sodium sulfate, and evaporated to dryness to yield 6α,7α - difluoromethylene - 9α - fluoro-11β,21 - dihydroxy - 16α,17α - isopropylidenedioxy - 20-keto - 2' - (4 - fluorophenyl) - pregn - 4 - eno - [3,2 - c]-pyrazole which is recrystallized from acetone:hexane.

In like manner, the corresponding 6β,7β compound is prepared.

By this procedure, there is analogously prepared 6α,7α-difluoromethylene - 6β - fluoro - 11β,21 - dihydroxy - 16α, 17α - isopropylidenedioxy - 20 - keto - 2' (4 - fluorophenyl) - pregn - 4 - eno - [3,2 -c] - pyrazole, M.P. 159–162° C., and the corresponding 6β,7β compound from 6-fluoro - 11β - hydroxy - 16α,17α - isopropylidenedioxy-21 - tetrahydropyran - 2 - yloxypregna - 4,6 - diene - 3,20-dione.

In a similar fashion, the following compounds are subjected to the procedures of this example:

6,9α-difluoro-11β-hydroxy-16α,17α-isopropylidenedioxy-21-tetrahydropyran-2-yloxypregna-4,6-diene-3,20-dione;
6-methyl-9α-fluoro-11β-hydroxy-16α,17α-isopropylidenedioxy-21-tetrahydropyran-2-yloxypregna-4,6-diene-3,20-dione;
6-chloro-9α-fluoro-11β-hydroxy-16α,17α-isopropylidenedioxy-21-tetrahydropyran-2-yloxypregna-4,6-diene-3,20-dione;
6-methyl-11β-hydroxy-16α,17α-isopropylidenedioxy-21-tetrahydropyran-2-yloxypregna-4,6-diene-3,20-dione;
6-chloro-11β-hydroxy-16α,17α-isopropylidenedioxy-21-tetrahydropyran-2-yloxypregna-4,6-diene-3,20-dione; and
11-hydroxy-16α,17α-isopropylidenedioxy-21-tetrahydropyran-2-yloxypregna-4,6-diene-3,20-dione.

There are thus obtained the following compounds:

6,7-difluoromethylene-6,9α-difluoro-11β,21-dihydroxy-16α,17α-isopropylidenedioxy-20-keto-2'-(4-fluorophenyl)-pregn-4-eno-[3,2-c]-pyrazole;
6,7-difluoromethylene-6-methyl-9α-fluoro-11β,21-dihydroxy-16α,17α-isopropylidenedioxy-20-keto-2'-(4-fluorophenyl)-pregn-4-eno-[3,2-c]-pyrazole;
6,7-difluoromethylene-6-chloro-9α-fluoro-11β,21-dihydroxy-16α,17α-isopropylidenedioxy-20-keto-2'-(4-fluorophenyl)-pregn-4-eno-[3,2-c]-pyrazole;
6,7-difluoromethylene-6-methyl-11β,21-dihydroxy-16α,17α-isopropylidenedioxy-20-keto-2'-(4-fluorophenyl)-pregn-4-eno-[3,2-c]-pyrazole;
6,7-difluoromethylene-6-chloro-11β,21-dihydroxy-16α,17α-isopropylidenedioxy-20-keto-2'-(4-fluorophenyl)-pregn-4-eno-[3,2-c]-pyrazole; and
6,7-difluoromethylene-11β,21-dihydroxy-16α,17α-isopropylidenedioxy-20-keto-2'-(4-fluorophenyl)-pregn-4-eno-[3,2-c]-pyrazole.

By substituting 16α,17α - isopropylidenedioxy-21-tetrahydropyran-2-yloxypregn-4,6-diene-3,20 - dione, obtained from the corresponding 21-hydroxy compound by the action of 2,3-dihydropyran in the presence of acid, to the procedure of this example, with the exception of the hydrolysis with sodium methoxide after the pyrazole formation, there is obtained 6,7-difluoromethylene-16α,17α-isopropylidenedioxy - 20 - keto - 21 - hydroxy - 2' - (4-fluorophenyl)-pregn-4-eno-[3,2-c]-pyrazole. Use of phenyl hydrazine hydrocloride in this variation yields 6,7-difluoromethylene - 16α,17α - isopropylidenedioxy-20-keto-21-hydroxy--2'-pregn-4-eno-[3,2-c]-pyrazole.

Likewise, by substituting phenyl hydrazine hydrochloride and hydrazine hydrate in the principal reaction sequences of this invention, there are respectively obtained 6,7-difluoromethylene-9α-fluoro - 11β,21 - dihydroxy-16α, 17α-isopropylidenedioxy - 20 - keto-2'-phenylpregn-4-eno-[3,2-c]-pyrazole and 6,7 - difluoromethylene - 9α - fluoro-11β,21-dihydroxy-16α,17α-isopropylidenedioxy - 20-keto-pregn-4-eno-[3,2-c]-pyrazole.

EXAMPLE 5

A suspension of 1 g. of 6,7-difluoromethylene-11β-hydroxy-17α,20;20,21 - bismethylenedioxypregn-4-en-3-one, obtained as an intermediate in Example 1, in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6,7-difluoromethylene-11β,17α,21 - trihydroxypregn- 4-ene-3,20-dione which may be further purified through recrystallization from isopropanol.

A mixture of 1 g. of 6α,7α-difluoromehylene-11β,17α,21-trihydroxypregn-4-ene-3,20-dione, 4 ml. of pyridine, and 2 ml. of acetic anhydride is allowed to stand at room temperature for 15 hours. The mixture is then poured into ice water and the solid which forms is collected by filtration, washed with water, and dried to yield 6,7-difluoromethylene - 11β,17α - dihydroxy-21-acetoxypregn-4-ene-3,20-dione which may be further purified through recrystallization from acetone:hexane.

To a suspension of 1 g. of 6,7-difluoromethylene-11β,17α-dihydroxy-21-acetoxypregn-4-ene-3,20-dione in 27 ml. of mehanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water, and dried to yield 6,7 - difluoromethylene-11β,17α-dihydroxy-21-acetoxypregn-4-ene-3,20-bis semicarbazone which is recrystallized from pyridine:methanol.

A solution of 1 g. of 6,7-difluoromethylene-11β,17α-dihydroxy-21-acetoxypregn-4-ene-3,20-bis semicarbazone in 20 ml. of acetic acid and 1 ml. of acetic anhydride is heated at reflux under nitrogen for one hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for two hours and is then diluted with water and extracted with chloroform. These extracts are washed with water, dilute potassium bicarbonate solution and water, dried over magnesium sulfate, and evaporated to dryness under reduced pressure. The residue is chromatographed on neutral alumina with benzene to yield 6,7-difluoromethylene-11β-hydroxy-21-acetoxypregn-4,16-diene - 3,20 - dione which may be recrystallized from acetone:ether.

A solution of 1 g. of 6,7-difluoromethylene-11β-hydroxy-21-acetoxypregn-4,16-diene-3,20-dione in 30 ml. of an ethereal solution of diazomethane is allowed to stand at room temperature for 24 hours. One milliliter of acetic acid is added to the mixture which is then evaporated to dryness under reduced pressure. The residue is heated gradually to 180° C. in vacuo, cooled, and recrystallized from acetone:hexane to yield 6,7-difluoromethylene-11β-hydroxy-16-methyl-21-acetoxypregna - 4,16 - diene - 3,20-dione.

To a stirred solution of 5 g. of 6,7-difluoromethylene-11β-hydroxy-16-methyl-21 - acetoxypregna - 4,16 - diene-3,20-dione in 350 ml. of methanol is added 20 ml. of 4 N aqueous sodium hydroxide and 20 ml. of 30% hydrogen peroxide, maintaining a temperature of approximately 15° C. The solution is allowed to stand at 0° C. for 15 hours and then poured into ice water. The solid which forms is collected by filtration, washed with water, and dried to yield 6,7-difluoromethylene-11β-hydroxy-16α,17α-oxido-16β-methyl-21-acetoxypregn - 4 - ene - 3,20 - dione which may be further purified by recrystallization from acetone:hexane.

To a solution of 1 g. of 6,7-difluoromethylene-11β-hydroxy-16α,17α-oxido-16β - methyl-21-acetoxypregn-4-ene-3,20-dione in 10 ml. of dioxane is added 0.5 ml. of a 50% w./v. solution of hydrogen bromide in acetic acid. After being allowed to stand for ten minutes at room temperature, the mixture is poured into water and extracted with ether. These ethereal extracts are dried over sodium sulfate and evaporated to dryness to yield 6,7-difluoromethylene-11β,17α-dihydroxy-16-methylene - 21 - acetoxypregn-4-ene-3,20-dione which may be further purified through recrystallization from acetone:hexane.

A suspension of 1 g. of 6,7-difluoromethylene-11β,17α-dihydroxy-16-methylene-21-acetoxypregn-4-ene-3,20 - dione in 60 ml. of methanol is treated with a solution of 1 g. of potassium carbonate in 6 ml. of water. The mixture is allowed to stand overnight at room temperature and diluted with water. The solid which forms is collected by filtration, washed with water, and dried to yield 6,7-difluoromethylene-11β,17α,21 - trihydroxy - 16 - methylenepregn-4-ene-3,20-dione which is recrystallized from acetone:hexane.

To a solution of 5 g. of 6,7-difluoromethylene-11β,17α,21-trihydroxy - 16 - methylenepregn - 4 - ene - 3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 6,7-difluoromethylene-11β-hydroxy - 16-methylene - 17α,20;20,21 - bismethylenedioxypregn-4-ene-3-one which is recrystallized from methanol:ether.

To a stirred solution of 3 g. of 6α,7α-difluoromethylene-11β-hydroxy - 16 - methylene - 17α,20;20,21-bismethylenedioxypregn-4-en-3-one in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum, and suspended in aqueous hydrochloric acid. This suspension is stirred at room temperature for half an hour and then filtered. The solid thus collected is washed with water and dried to yield 2-hydroxymethylene - 6α,7α - difluoromethylene - 11β-hydroxy - 16 - methylene - 17α,20;20,21-bismethylenedioxypregn-4-en-3-one which is recrystallized from methylene chloride:hexane.

The 6β,7β compound is similarly prepared.

A mixture of 1 g. of 2-hydroxymethylene-6α,7α-difluoromethylene - 11β - hydroxy - 16 - methylene-17α,20;20,21-bismethylenedioxypregn - 4 - en - 3 - one and 1.2 equivalents of phenylhydrazine hydrochloride in 15 ml. of absolute ethanol is refluxed for two hours under nitrogen. The reaction mixture is taken to dryness and water is added to the residue. The solid obtained upon filtration is washed successively with water, dilute acid, water and petroleum ether, and then redissolved in 50 ml. of methanol and 10 ml. of 1.33 N. sodium methoxide in methanol. After being allowed to stand under nitrogen, the solution is neutralized with acetic acid, diluted with ethyl acetate, washed with water, and dried over sodium sulfate. Evaporation of the solvent then yields 6α,7α-difluoromethylene - 11β - hydroxy - 16 - methylene - 17α,20;20,21-bismethylenedioxy - 2' - phenylpregn - 4 - eno-[3,2-c]-pyrazole.

The 6β,7β compound is similarly prepared.

A suspension of 1 g. of 6,7-difluoromethylene-11β-hydroxy - 16 - methylene - 17α,20;20,21-bismethylenedioxy - 2' - phenylpregn - 4 - eno - [3,2-c]-pyrazole in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6,7-difluoromethylene - 11β,17α,21-trihydroxy - 16 - methylene - 20 - keto - 2' - phenylpregn-4-eno-[3,2-c]-pyrazole which may be further purified through recrystallization from isopropanol.

In a similar fashion, the following compounds, all prepared as intermediates in Example 1, are subjected to the procedure of this example:

6,7-difluoromethylene-6-fluoro-11β-hydroxy-17α,20;20,21-bismethylenedioxypregn-4-en-3-one;
6,7-difluoromethylene-6-methyl-11β-hydroxy-17α,20;20,21-bismethylenedioxypregn-4-en-3-one;

6,7-difluoromethylene-6-chloro-11β-hydroxy-17α,20;20,
  21-bismethylenedioxypregn-4-en-3-one;
6,7-difluoromethylene-6,9α-difluoro-11β-hydroxy-17α,
  20;20,21-bismethylenedioxypregn-4-en-3-one;
6,7-difluoromethylene-6-methyl-9α-fluoro-11β-hydroxy-
  17α,20;20,21-bismethylenedioxypregn-4-en-3-
  one; and
6,7-difluoromethylene-6-chloro-9α-fluoro-11β-hydroxy-
  17α,20;20,21-bismethylenedioxypregn-4-en-3-one.

There are thus respectively obtained, the following compounds:

6,7-difluoromethylene-6-fluoro-11β,17α,21-trihydroxy-
  16-methylene-20-keto-2'-phenylpregn-4-eno-
  [3,2-c]-pyrazole;
6,7-difluoromethylene-6-methyl-11β,17α,21-trihydroxy-
  16-methylene-20-keto-2'-phenylpregn-4-eno-
  [3,2-c]-pyrazole;
6,7-difluoromethylene-6-chloro-11β,17α,21-trihydroxy-
  16-methylene-20-keto-2'-phenylpregn-4-eno-
  [3,2-c]-pyrazole;
6,7-difluoromethylene-6,9α-difluoro-11β,17α,21-tri-
  hydroxy-16-methylene-20-keto-2'-phenylpregn-
  4-eno-[3,2-c]-pyrazole;
6,7-difluoromethylene-6-methyl-9α-fluoro-11β,17α,
  21-trihydroxy-16 1methylene-20-keto-2'-phenyl-
  pregn-4-eno-[3,2-c]-pyrazole; and
6,7-difluoromethylene-6-chloro-9α-fluoro-11β,17α,21-
  trihydroxy-16-methylene-20-keto-2'phenylpregn-
  4-eno-[3,2-c]-pyrazole.

EXAMPLE 6

A refluxing solution of 1 g. of 9α-fluoro-11β-hydroxy-16α - methyl - 17α20;20,21-bismethylenedioxypregna-4,6-dien-3-one in 15 ml. of dimethyl diethylene glycol ether, under nitrogen, is treated in a dropwise fashion with a 50% w./v. solution of sodium trichloroacetate in dimethyl diethylene glycol ether. When there is no change in the U.V. spectrum upon the addition of five equivalents of reagent, the refluxing is discontinued. The reaction mixture is filtered, refluxed briefly in methanolic potassium bicarbonate, and chromatographed on alumina with 3:1 hexane:methylene chloride to yield 6α,7α-dichloromethylene - 9α - fluoro-11β-hydroxy - 16α - methyl - 17α, 20;20,21 - bismethylenedioxypregn - 4 - en - 3 - one and the corresponding 6β,7β compound.

In like manner, the other Δ4,6-dienes contemplated by this invention are thus treated to give the corresponding 6,7-dichloromethylene derivatives.

To a stirred solution of 3 g. of 6α,7α - dichloromethylene - 9α - fluoro - 11β - hydroxy - 16α-methyl-17α,20;20,21 - bismethylenedioxypregn - 4 - en - 3-one in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum, and suspended in aqueous hydrochloric acid. This suspension is stirred at room temperature for half an hour and then filtered. The solid thus collected is washed with water and dried to yield 2 - hydroxymethylene - 6α,7α - dichloromethylene - 9α - fluoro - 11β - hydroxy - 16α - methyl-17α,20;20,21 - bismethylenedioxypregn - 4 - en - 3-one which is recrystallized from methylene chloride:hexane.

The 6β,7β compound is similarly prepared.

A mixture of 0.85 g. of 2 - hydroxymethylene-6α,7α-dichloromethylene - 9α - fluoro - 11β - hydroxy - 16α-methyl - 17α,20;20,21 - bismethylenedioxypregn-4-en-3-one in 10 ml. of absolute ethanol and 0.16 ml. of hydrazine hydrate in 0.16 ml. of absolute ethanol is heated at reflux under nitrogen for 45 minutes. The solid obtained upon evaporation in vacuo of the reaction mixture is washed with cold water and dried to yield 6α,7α-dichloromethylene - 9α - fluoro - 11β - hydroxy-16α-methyl-17α,20;20,21 - bismethylenedioxypregn-4-eno-[3,2-c]-pyrazole.

The corresponding 6β,7β compound is similarly prepared.

A suspension of 1 g. of 6,7 - dichloromethylene-9α-fluoro - 11β - hydroxy - 16α - methyl - 17α,20;20,21-bismethylenedioxypregn - 4 - eno - [3,2-c]-pyrazole in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane: ethyl acetate to yield 6,7 - dichloromethylene - 9α-fluoro-11β,17α,21 - trihydroxy - 16α - methyl - 20 - ketopregn-4-eno-[3,2-c] - pyrazole which may be further purified through recrystallization from isopropanol.

Similarly, the bismethylenedioxy derivatives of the various pregna-4,6-dienes listed in Example 1 are subjected to the procedures of this example to yield the corresponding 6,7 - dichloromethylenepregn-4-eno-[3,2-c]-pyrazoles.

EXAMPLE 7

A solution of 6 g. of 9α - fluoro - 11β - hydroxy - 16α-methyl - 17α,20;20,21 - bismethylenedioxypregna - 4,6-dien-3-one in 120 ml. of pyridine is added to a mixture of 6 g. of chromic trioxide in 20 ml. of pyridine. The reaction mixture is allowed to stand at room temperature for 15 hours, diluted with ethyl acetate, and filtered through Celite diatomaceous earth. The filtrate is washed well with water, dried, and evaporated to dryness to yield 9α - fluoro - 16α - methyl - 17α,20;20,21 - bismethylenedioxypregna-4,6-diene-3,11-dione.

A solution of 0.5 g. of 9α - fluoro - 16α - methyl-17α,20;20,21 - bismethylenedioxypregna - 4,6-diene-3,11-dione in 5 ml. of dimethylsulfoxide is added to a solution of one equivalent of dimethylsufoxonium methylide in dimethylsulfoxide, prepared in the manner of Corey et al., J.A.C.S., 87, 1353 (1965). The mixture is stirred under nitrogen and at room temperature for 20 hours and at 50° C. for seven hours. Fifty milliliters of water are then added and the resulting mixture is extracted four times with 50 ml. portions of ethyl acetate. The combined extracts are washed with water and saturated aqueous sodium chloride solution, dried over sodium sulface, and evaporated to dryness. This residue is then chromatographed on silica, eluting with 1:9 ether:methylene chloride to yield 6α,7α - methylene - 9α - fluoro - 16α-methyl-17α,20;20,21 - bismethylenedioxypregn - 4 - ene - 3,11-dione and 6β,7β - methylene - 9α - fluoro - 16α - methyl-17α,20;20,21-bismethylenedioxypregn-4-ene-3,11-dione.

In like manner, the other Δ4,6-dienes contemplated by this invention are so treated to give the corresponding 6,7-methylene derivatives.

To a stirred solution of 3 g. of 6α,7α-methylene-9α-fluoro - 16α - methyl - 17α,20;20,21 - bismethylenedioxypregn-4-ene-3,11-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum, and suspended in aqueous hydrochloric acid. This suspension is stirred at room temperature for half an hour and then filtered. The solid thus collected is washed with water and dried to yield 2-hydroxymethylene - 6α,7α - methylene - 9α - fluoro-16α-methyl - 17α,20;20,21 - bismethylenedioxypregn - 4-ene-2,11-dione which is recrystallized from methylene chloride:hexane.

Similarly, the 6β,7β compound is prepared.

A solution of 1 g. of 2 - hydroxymethylene - 6α,7α-methylene - 9α - fluoro - 16α - methyl - 17α,20;20,21- bismethylenedioxypregn-4-ene-3,11-dione in 10.1 ml. of absolute ethanol is treated with 0.3 ml. of phenyl hydrazine hydrochloride. The mixture is refluxed under nitrogen for 40 minutes, cooled, and filtered. The solid thus collected is recrystallized from acetone:hexane to yield 6α,7α - methylene - 9α - fluoro - 11 - keto - 16α-methyl - 17α,20;20,21 - bismethylenedioxy - 2' - phenylpregn-4-eno-[3,2-c]-pyrazole.

The corresponding 6β,7β compound is similarly prepared.

A solution of 1 g. of 6,7-methylene-9α-fluoro-11-keto-16α-methyl-17α,20;20,21-bismethylenedioxy - 2' - phenylpregn-4-eno-[3,2-c]-pyrazole in 50 ml. of tetrahydrofuran is added over a 30-minute period to a stirred suspension of 1 g. of lithium aluminum hydride in 50 ml. of anhydrous tetrahydrofuran and this mixture is heated at reflux for two hours. To the mixture are cautiously added 5 ml. of ethyl acetate and 2 ml. of water. Sodium sulfate is next added, the mixture is filtered, and the solid thus collected is washed with hot ethyl acetate. The combined organic solutions are then evaporated to yield 6,7-methylene-9α-fluoro-11β-hydroxy-16α-methyl - 17α,20;20,21-bismethylenedioxy - 2' - phenylpregn-4-eno-[3,2-c]-pyrazole which may be further purified through recrystallization from acetone:hexane.

A suspension of 1 g. of 6,7-methylene-9α-fluoro-11β-hydroxy-16α-methyl - 17α,20;20,21 - bismethylenedioxy-2'-phenylpregn-4-eno-[3,2-c]-pyrazole in 10 ml. of 48% aqueous potassium bicarbonate solution and extracted with ethyl acetate. These extracts are evaporated to dryness under reduced pressure and chromatographed on silica gel with 2:1 hexane:ethyl acetate to yield 6,7-methylene-9α-fluoro-11β,17α,21-trihydroxy - 16α - methyl-20-keto-2'-phenylpregn-4-eno-[3,2-c]-pyrazole which is recrystallized from isopropanol.

Alternatively, the following procedure may be employed. A solution of 1 g. of 6,7-dichloromethylene-9α-fluoro - 11β - hydroxy-16α-methyl-17α,20;20,21-bismethylenedioxypregn-4-en-3-one in anhydrous ethyl ether is stirred under nitrogen for 48 hours with a molar excess of lithium aluminum hydride. The mixture is then treated with 2 ml. of ethyl acetate and 1 ml. of water, filtered, the solid being washed with hot ethyl acetate, dried over sodium sulfate, and evaporated to dryness. This residue, in sufficient dioxane, and 1.1 molar equivalents of 2,4-dichloro-5,6-dicyano-1,4-benzoquinone are allowed to stand at 25° C. for three hours. After filtration, the solution is evaporated to dryness and the residue dissolved in acetone and filtered through alumina to yield, after evaporation, 6,7-methylene - 9α - fluoro-11β-hydroxy-16α-methyl-17α,20;20,21 - bismethylenedioxypregn-4-en-3-one which is treated with ethyl formate and sodium hydride as described above. One gram of the product thus obtained in 10 ml. of absolute ethanol and 0.3 ml. of phenyl hydrazine hydrochloride is heated at reflux under nitrogen for 45 minutes. The mixture is cooled, filtered, and washed with cold water. The solid thus collected is recrystallized from acetone:hexane to yield 6,7-methylene-9α-fluoro-11β-hydroxy-16α-methyl - 17α,20;20,21 - bismethylenedioxy - 2' - phenylpregn-4-eno-[3,2-c]-pyrazole which is cleaved with hydrofluoric acid in the manner described above.

In a similar fashion, the following compounds are obtained according to the principal procedure of this example:

6,7-methylene-11β,17α,21-trihydroxy-20-keto-2'-phenylpregn-4-eno-[3,2-c]-pyrazole;
6,7-methylene-9α-fluoro-11β,17α,21-trihydroxy-20-keto-2'-phenylpregn-4-eno-[3,2-c]-pyrazole;
6,7-methylene-11β,17α,21-trihydroxy-16α-methyl-20-keto-2'-phenylpregn-4-eno-[3,2-c]-pyrazole;
6,7-methylene-11β,17α,21-trihydroxy-16β-methyl-keto-2'-phenylpregn-4-eno-[3,2-c]-pyrazole;
6,7-methylene-9α-fluoro-11β,17α,21-trihydroxy-16β-methyl-20-keto-2'-phenylpregn-4-eno-[3,2-c]-pyrazole;
6,7-methylene-6-chloro-11β,17α,21-trihydroxy-20-keto-2'-phenylpregn-4-eno-[3,2-c]-pyrazole;
6,7-methylene-6-chloro-9α-fluoro-11β,17α,21-trihydroxy-20-keto-2'-phenylpregn-4-eno-[3,2-c]-pyrazole;
6,7-methylene-6-chloro-11β,17α,21-trihydroxy-16α-methyl-20-keto-2'-phenylpregn-4-eno-[3,2-c]-pyrazole;
6,7-methylene-6-chloro-9α-fluoro-11β,17α,21-trihydroxy-16α-methyl-20-keto-2'-phenylpregn-4-eno-[3,2-c]-pyrazole;
6,7-methylene-6-fluoro-11β,17α,21-trihydroxy-20-keto-2'-phenylpregn-4-eno-[3,2-c]-pyrazole;
6,7-methylene-6-fluoro-11β,17α,21-trihydroxy-16α-methyl-20-keto-2'-phenylpregn-4-eno-[3,2-c]-pyrazole;
6,7-methylene-6,9α-difluoro-11β,17α,21-trihydroxy-20-keto-2'-phenylpregn-4-eno-[3,2-c]-pyrazole;
6,7-methylene-6,9α-difluoro-11β,17α,21-trihydroxy-16α-methyl-20-keto-2'-phenylpregn-4-eno-[3,2-c]-pyrazole;
6,7-methylene-6,9α-difluoro-11β,17α,21-trihydroxy-16β-methyl-20-keto-2'-phenylpregn-4-eno-[3,2-c]-pyrazole;
6,7-methylene-6-methyl-11β,17α,21-trihydroxy-20-keto-2'-phenylpregn-4-eno-[3,2-c]-pyrazole;
6,7-methylene-6,16α-dimethyl-11β,17α-21-trihydroxy-20-keto-2'-phenylpregn-4-eno-[3,2-c]-pyrazole;
6,7-methylene-6-methyl-9α-fluoro-11α,17α,21-trihydroxy-20-keto-2'-phenylpregn-4-eno-[3,2-c]-pyrazole;
6,7-methylene-6,16α-dimethyl-9α-fluoro-11β-17α,21-trihydroxy-20-keto-2'-phenylpregn-4-eno-[3,2-c]-pyrazole; and
6,7-methylene-9α,16α-difluoro-11β,17α,21-trihydroxy-20-keto-2'-phenylpregn-4-eno-[3,2-c]-pyrazole.

The corresponding 11β-desoxy compounds, such as 6,7-methylene-16α-methyl - 21 - hydroxy-20-keto-2'-(4-fluorophenyl)-pregn-4-eno-[3,2-c]-pyrazole and 6,7-methylene-16α - methyl - 17α,21 - dihydroxy-20-keto-2'-(4-fluorophenyl)-pregn - 4 - eno-[3,2-c]-pyrazole, are analogously prepared, eliminating the unnecessary oxidation step.

By utilizing an equivalent amount of p-fluorophenylhydrazine hydrochloride in place of phenylhydrazine hydrochloride in the procedures of this example, there are obtained the corresponding 2'-(4-fluorophenyl)-pregn-4-eno-[3,2-c]-pyrazoles, notably the following:

6,7-methylene-9α-fluoro-11β,17α,21-trihydroxy-16α-methyl-20-keto-2'-(4-fluorophenyl)-pregn-4-eno-[3,2-c]-pyrazole;
6,7-methylene-11β,17α,21-trihydroxy-16α-methyl-20-keto-2'-(4-fluorophenyl)-pregn-4-eno-[3,2-c]-pyrazole;
6,7-methylene-9α-fluoro-11β,17α,21-trihydroxy-16β-methyl-20-keto-2'-(4-fluorophenyl)-pregn-4-eno-[3,2-c]-pyrazole;
6,7-methylene-6,9α-difluoro-11β,17α,21-trihydroxy-16α-methyl-20-keto-2'-(4-fluorophenyl)-pregn-4-eno-[3,2-c]-pyrazole; and
6,7-methylene-6-fluoro-11β,17α,21-trihydroxy-16α-methyl-20-keto-2'-(4-fluorophenyl)-pregn-4-eno-[3,2-c]-pyrazole.

EXAMPLE 8

To a solution of 5 g. of 9α-fluoro-11β,16α,17α,21-tetrahydroxypregna-4,6-diene-3,20-dione in 200 ml. of chloroform are added 40 ml. of 37% aqueous formaldhyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate, and evaporated to dryness to yield 9α-fluoro-11β,16α-dihydroxy-17α,20;20,21 - bismethylenedioxypregna-4,6-dien-3-one which is recrystallized from methanol:ether.

A mixture of 1 g. of 9α-fluoro-11β,16α-dihydroxy-17α,20;20,21-bismethylenedioxypregna-4,6-dien-3 - one, 4 ml. of pyridine and 2 ml. of acetic anhydride is allowed to stand at room temperature for 15 hours. The mixture is then poured into ice water and the solid which forms is collected by filtration, washed with water, and dried to yield 9α-fluoro-11β-hydroxy-16α-acetoxy - 17α,20;20,21-bismethylenedioxypregna-4,6-dien-3 - one which may be further purified through recrystallization from acetone: hexane.

A solution of 6 g. of 9α-fluoro-11β-hydroxy-16α-acetoxy-17α,20;20,21-bismethylenedioxypregna-4,6-dien - 3-one in 120 ml. of pyridine is added to a mixture of 6 g. of chromic trioxide in 20 ml. of pyridine. The reaction mixture is allowed to stand at room temperature for 15 hours, diluted with ethyl acetate, and filtered through Celite diatomaceous earth. The filtrate is washed well with water, dried, and evaporated to dryness to yield 9α-fluoro-16α-acetoxy-17α,20;20,21-bismethylenedioxypregna - 4,6-diene-3,11-dione which may be further purified by recrystallization from acetone:hexane.

A solution of 1 g. of 9α-fluoro-16α-acetoxy-17α,20;20,21-bismethylenedioxypregna-4,6-diene-3,11 - dione in 10 ml. of dimethylsulfoxide is added to a solution of one equivalent of dimethylsulfoxonium methylide in dimethylsulfoxide. The mixture is stirred under nitrogen at room temperature for 20 hours and at 50° C. for seven hours. Fifty milliliters of water are then added and the resulting mixture is extracted four times with 100 ml. portions of ethyl acetate. The combined extracts are washed with water and saturated aqueous sodium chloride solution, dried over sodium sulfate, and evaporated to dryness. This residue is then chromatographed on silica, eluting with 1:9 ether:methylene chloride to yield 6α,7α-methylene - 9α-fluoro-16α-acetoxy-17α,20;20,21-bismethylenedioxypregn-4-ene-3,11-dione as well as the corresponding 6β,7β compound.

One gram of 6,7-methylene-9α-fluoro-16α-acetoxy-17α,20;20,21-bismethylenedioxypregn-3-ene-3,11 - dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6,7-methylene-9α-fluoro-16α-hydroxy-17α,20;20,21-bismethylenedioxypregn-4-ene - 3,11 - dione which is collected by filtration and recrystallized from acetone:hexane.

A solution of 1 g. of sodium borohydride in 3 ml. of water is added to an ice-cooled solution of 1 g. of 6,7-methylene-9α-fluoro-16α-hydroxy - 17α,20;20,21 - bismethylenedioxypregn-4-ene-3,11-dione in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield 3β,11β,16α-trihydroxy-6,7-methylene - 9α - fluoro-17α,20;20,21-bismethylenedioxypregn-4-ene which may be purified further by recrystallization from acetone.

A mixture of 1 g. of 3β,11β,16α-trihydroxy-6,7-methylene-9α-fluoro - 17α,20;20,21 - bismethylenedioxypregn-4-ene in 20 ml. of dioxane and 1.1 molar equivalents of 2,3-di-chloro-5,6-dicyano-1,4-benzoquinone is allowed to stand at room temperature for three hours. The solid formed during the reaction is removed by filtration and the filtrate evaporated to dryness. The residue is dissolved in acetone and filtered through 20 g. of alumina to yield 6,7-methylene-9α-fluoro-11β,16α-dihydroxy-17α,20;20,21-bismethylenedioxypregn-4-en-3-one which may be further purified by recrystallization from acetone:hexane.

A suspension of 1 g. of 6,7-methylene-9α-fluoro-11β,16α - dihydroxy - 17α20;20,21 - bismethylenedioxypregn-4-en-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6,7-methylene-9α-fluoro-11β,16α,17α,21 - tetrahydroxy - pregn - 4 - ene - 3,20-dione which may be further purified through recrystallization from isopropanol.

To 120 ml. of acetone containing 1 g. of 6,7-methylene - 9α - fluoro - 11β,16α,17α,21 - tetrahydroxypregn-4-ene-3,20-dione are added 30 drops of 70% perchloric acid. The mixture is allowed to stand one hour at room temperature, 30 drops of pyridine are added, and the solution is evaporated to dryness under reduced pressure. Thirty milliliters of water are added to the residue and this mixture is extracted several times with ethyl acetate. The combined extracts are washed to neutrality with water, dried over sodium sulfate, and evaporated to dryness. The residue, upon trituration with methanol, yields 6,7-methylene - 9α - fluoro - 11β,21 - dihydroxy - 16α,17α-isopropylidenedioxypregn-4-ene-3,20-dione which is recrystallized from methanol.

Two milliliters of dihydropyran are added to a solution of 1 g. of 6,7-methylene-9α-fluoro-11β,21-dihydroxy-16α,17α - isopropylidenedioxypregn - 4 - ene - 3,20-dione in 15 ml. of benzene. About 1 ml., if removed by distillation to remove moisture, and 0.4 g. of p-toluenesulfonic acid is added to the cooled solution. This mixture is allowed to stand at room temperature for four days and is then washed with aqueous sodium carbonate solution and water, dried, and evaporated. The residue is chromatographed on neutral alumina, eluting with hexene, to yield 6,7 - methylene - 9α - fluoro - 11β - hydroxy-16α,17α - isopropylidenedioxy - 21 - tetrahydropyran - 2-yloxypregn-4-ene-3,20-dione which is recrystallized from pentane.

The corresponding 21-tetrahydrofuran-2-yloxy is similarly prepared by use of dihydrofuran in lieu of dihydropyran.

To a stirred solution of 3 g. of 6α,7α-methylene-9α-fluoro - 11β - hydroxy - 16α,17α - isopropylidenedioxy - 21-tetrahydropyran-2-yloxypregn-4-ene-2,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum, and suspended in aqueous hydrochloric acid. This suspension is stirred at room temperature for half and hour and then filtered. The solid thus collected is washed with water and dried to yield 2-hydroxymethylene - 6α,7α - methylene - 9α-fluoro - 11β - hydroxy - 16α,17α - isopropylidenedioxy-21 - tetrahydropyran - 2 - yloxypregn - 4 - ene - 3,20 - dione which is recrystallized from methylene chloride:hexane.

Similarly prepared is the 6β,7β compound.

One gram of 2 - hydroxymethylene - 6α,7α - methylene - 9α - fluoro - 11β - hydroxy - 16α,17α - isopropylidenedioxy - 21 - tetrahydropyran - 2 - yloxypregn - 4-ene-3,20-dione, suspended in 10 ml. of absolute ethanol, is treated with 1.2 equivalents of sodium acetate followed by 1.2 equivalents of p-fluoro-phenylhydrazine hydrochloride. This mixture is heated under nitrogen at reflux temperatures for one hour and then evaporated to dryness. The residue is dissolved in ether and this ethereal solution is washed three times with 2.5 N hydrochloric acid, three times with 2.5 N sodium hydroxide solution and with water, dried over magnesium sulfate, and concentrated to dryness under reduced pressure. The residue thus obtained is redissolved in 100 ml. of methanol and 20 ml. of 1.33 N sodium methoxide in methanol. This mixture is allowed to stand under nitrogen for ten minutes and is then neutralized with acetic acid. It is next extracted with ethyl acetate and the organic extracts are washed with water, dried over magnesium sulfate, and evaporated to yield 6,7 - methylene - 9α - fluoro - 11β-hydroxy - 16α,17α - isopropylidenedioxy - 20 - keto - 21-tetrahydropyran - 2 - yloxy - 2' - (4 - fluorophenyl)-pregn - 4 - eno - [3,2 - c] - pyrazole which is further purified through recrystallization from acetone:hexane.

To a solution of 1 g. of 6,7-methylene-9α-fluoro-11β-hydroxy - 16α,17α - isopropylidenedioxy - 20 - keto - 21-tetra - hydropyran - 2 - yloxy - 2' - (4 - fluorophenyl)-pregn-4-eno-[3,2-c]pyrazole in 30 ml. of acetic acid is added 0.5 ml. of 2 N hydrochloric acid. The mixture is allowed to stand five hours at room temperature and then diluted with ice water and extracted with methylenechloride. The extracts are washed with water to neutrality, dried over sodium sulfate, and evaporated to dryness to yield 6,7 - methylene - 9α - fluoro - 11β,21 - dihydroxy-16α,17α - isopropylidenedioxy - 20 - keto - 2' - (4 - fluorophenyl)-pregn-4-eno-[3,2-c]-pyrazole which is recrystalized from acetone:hexane.

As a first alternative procedure, 6,7-methylene-9α-fluoro - 16α - acetoxy - 17α,20;20,21 - bismethylenedioxy-pregn-4-ene-3,11-dione is treated with ethyl formate and sodium hydride, in the manner described above, to yield the corresponding 2-hydroxymethylene derivative which when treated with p-fluorophenylhydrazine hydrochloride yields 6,7 - methylene - 9α - fluoro - 11 - keto - 16α - acetoxy - 17α20;20,21 - bismethylenedioxy - 2' - (4 - fluoromethyl)-pregn-4-eno-[3,2-c]-pyrazole. Upon basic hydrolysis of the 16α-acetoxy group, in the manner described above, to yield the corresponding 16α-hydroxy derivative and reduction of the 11-keto group with sodium borohydride, there is obtained 6,7-methylene-9α-fluoro-11β, 16α - diol - 17α,20;20,21 - bismethylenedioxy - 2' - (4-fluorophenyl)-pregn-4-eno-[3,2-c]-pyrazole which is treated with hydrofluoric acid according to the procedures herein described to yield 6,7 - methylene - 9α - fluoro-11β,16α,17α,21 - tetrahydroxy - 20 - keto - 2' - (4 - fluorophenyl)-pregn-4-eno[3,2-c]-pyrazole. This compound is then allowed to react with acetone in the presence of perchloric acid to form the corresponding 16α,17α-isopropylidenedioxy derivative.

As a second alternative procedure, 9α-fluoro-11β-hydroxy - 16α - acetoxy - 17α,20;20,21 - bismethylenedioxy-pregna-4,6-dien-3-one is treated with two equivalents of dimethylsulfoxonium methylide. The reaction product is hydrolyzed with base as described above to yield 6,7-methylene - 9α - fluoro - 11β,16α - dihydroxy-17α,20;20,21-bismethylenedioxypregn-4-ene-3,11-dione which, upon treatment with hydrofluoric acid, yields 6,7-methylene-9α-fluoro - 11β,16α,17α,21 - tetrahydroxypregn - 4-ene-3,20-dione which is further processed in the manner previously described.

In a similar fashion, the following compounds are obtained according to the foregoing procedures:

6,7-methylene-11β,21-dihydroxy-16α,17α-isopropylidene-dioxy-20-keto-2'-(4-fluorophenyl)-pregn-4-eno-[3,2-c]-pyrazole;

6,7-methylene-6-chloro-11β,21-dihydroxy-16α,17α-isopropylidenedioxy-20-keto-2'-(4-fluorophenyl)-pregn-4-eno-[3,2-c]-pyrazole;

6,7-methylene-16β-fluoro-11β,21-dihydroxy-16α,17α-isopropylidenedioxy-20-keto-2'-(4-fluorophenyl)-pregn-4-eno-[3,2-c]-pyrazole;

6,7-methylene-6-methyl-11β,21-dihydroxy-16α,17α-isopropylidenedioxy-20-keto-2'-(4-fluorophenyl)pregn-4-eno-[3,2-c]-pyrazole;

6,7-methylene-6-chloro-9α-fluoro-11β,21-dihydroxy-16α,-17α-isopropylidenedioxy-20-keto-2'-(4-fluorophenyl)-pregn-4-eno-[3,2-c]-pyrazole;

6,7-methylene-6,9α-difluoro-11β,21-dihydroxy-16α,17α-isopropylidenedioxy-20-keto-2'-(4-fluorophenyl)-pregn-4-eno-[3,2-c]-pyrazole; and 6,7-methylene-6-methyl-9α-fluoro-11β,21-dihydroxy-16α,17α-isopropylidenedioxy-20-keto-2'-(4-fluorophenyl)-pregn-4-eno-[3,2-c]-pyrazole.

By utilizing an equivalent amount of phenylhydrazine hydrochloride in place of p-fluorophenylhydrazine, the following compounds are obtained:

6,7-methylene-9α-fluoro-11β,21-dihydroxy-16α,17α-isopropylidenedioxy-20-keto-2'-phenylpregn-4-eno-[3,2-c]-pyrazole;

6,7-methylene-11β,21-dihydroxy-16α,17α-isopropylidenedioxy-20-keto-2'-phenylpregn-4-eno-[3,2-c]pyrazole;

6,7-methylene-6-chloro-11β,21-dihydroxy-16α,17α-isopropylidenedioxy-20-keto-2'-phenylpregn-4-eno-[3,2-c]-pyrazole;

6,7-methylene-6-fluoro-11β,21dihydroxy-16α,17α-isopropylidenedioxy-20-keto-2'-phenylpregn-4-eno-[3,2-c]-pyrazole;

6,7-methylene-6-methyl-11β,21-dihydroxy-16α,17α-isopropylidenedioxy-20-keto-2'-phenylpregn-4-eno-[3,2-c]-pyrazole;

6,7-methylene-6-chloro-9α-fluoro-11β,21-dihydroxy-16α-17α-isopropylidenedioxy-20-keto-2'-phenylpregn-4-eno-[3,2-c]-pyrazole;

6,7-methylene-6,9α-difluoro-11β,21-dihydroxy-16α,17α-isopropylidenedioxy-20-keto-2'-phenylpregn-4-eno-[3,2-c]-pyrazole; and 6,7-methylene-6-methyl-9α-fluoro-11β,21-dihydroxy-16α,17α-isopropylidenedioxy-20-keto-2'-phenylpregn-4-eno-[3,2-c]-pyrazole.

Likewise, by the use of hydrazine hydrate, the following compounds are obtained:

6,7-methylene-9α-fluoro-11β,21-dihydroxy-16α,17α-isopropylidenedioxy-20-ketopregn-4-eno-[3,2-c]-pyrazole;

6,7-methylene-11β,21-dihydroxy-16α,17α-isopropylidenedioxy-20-ketopregn-4-eno-[3,2-c]-pyrazole;

6,7-methylene-6-chloro-11β,21-dihydroxy-16α,17α-isopropylidenedioxy-20-ketopregn-4-eno-[3,2-c]-pyrazole;

6,7-methylene-6-chloro-11β,21-dihydroxy-16α,17α-isopropylidenedioxy-20-ketopregn-4-eno-[3,2-c]-pyrazole;

6,7-methylene-6-fluoro-11β,21-dihydroxy-16α,17α-isopropylidenedioxy-20-ketopregn-4-eno-[3,2-c]-pyrazole;

6,7-methylene-6-methyl-11β,21-dihydroxy-16α,17α-isopropylidenedioxy-20-ketopregn-4-eno-[3,2-c]-pyrazole;

6,7-methylene-6-chloro-9α-fluoro-11β,21-dihydroxy-16α,17α-isopropylidenedioxy-20-ketopregn-4-eno-[3,2-c]-pyrazole;

6,7-methylene-6,9α-difluoro-11β,21-dihydroxy-16α,17α-isopropylidenedioxy-20-ketopregn-4-eno-[3,2-c]-pyrazole; and 6,7-methylene-6-methyl-9α-fluoro-11β,21-dihydroxy-16α,17α-isopropylidenedioxy-20-ketopregn-4-eno-[3,2-c]-pyrazole.

By subjecting 6,7-methylene-16α-acetoxy-17α,20;20,21-bismethylenedioxypregn-4-en-3-one (obtained from the corresponding $\Delta^{4,6}$-diene as described above) to the second alternative procedure of this example, except for the sodium borohydride reduction, there is obtained 6,7-methylene - 16α,17α - isopropylidenedioxy - 20 - keto - 21 - hydroxy - 2' - (4 - fluorophenyl) - pregn - 4 - eno - [3,2 - c]-pyrazole.

EXAMPLE 9

To a cooled solution (0° C.), of 3,4 g. of 6,7-difluoromethylene - 9α - fluoro - 11β,17α,21 - trihydroxy - 16α-methyl - 20 keto - 2' - (4 - fluorophenyl) - pregn - 4 - eno-[3,2-c]-pyrazole in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water, and sodium bicarbonate solution. The chloroform is removed by evaporation under reduced pressure and the residue is dissolved in 20 ml. of acetone treated at room temperature and under stirring with 4 g. of sodium iodide. Sodium thiosulfate solution is added followed by water. The solid is collected and dried to yield 6,7-difluoromethylene - 9α - fluoro - 11β,17α - dihydroxy - 16α - methyl-20 - keto - 21 - iodo - 2' - (4 - fluorophenyl) - pregn - 4-eno-[3,2-c]-pyrazole. This material in 20 ml. of acetonitrile is treated dropwise with 1.4 g. of silver fluoride in 3 ml. of water. The mixture is allowed to stand at room temperature for 24 hours and then filtered. The filtrate is concentrated and the solid is collected and dried to yield 6,7 - difluoromethylene-9α-21-difluoro-11β,17α-dihydroxy - 16α - methyl - 20 - keto - 2' - (4 - fluorophenyl)-pregn-4-eno-[3,2-c]-pyrazole which is recrystallized from methanol:acetone.

By utilizing lithium chloride or silver chloride in place of silver fluoride, there is obtained instead 6,7-difluoromethylene - 9α - fluoro-11β,17α-dihydroxy-16α-methyl-20-keto - 21 - chloro-2'-(4-fluorophenyl)-pregn - 4 - eno-[3,2-c]-pyrazole.

Likewise, the various other 21-hydroxy compounds of the present invention are converted to the corresponding 21-fluoro or 21-chloro derivatives through utilization of the procedures of this example.

EXAMPLE 10

A mixture of 1 g. of 6,7-difluoromethylene-9α-fluoro-11β,17α-dihydroxy-16α-methyl - 20 - keto-21-iodo-2'-(4-fluorophenyl)-pregn-4-eno-[3,2-c]-pyrazole, obtained via the initial procedure of Example 9, and 1.1 molar equivalents of silver monobasic phosphate in 60 ml. of acetonitrile is heated at reflux for two hours. The mixture is then filtered and evaporated to dryness to yield 6,7-difluoromethylene - 9α - fluoro - 11β,17α - dihydroxy-16α-methyl - 20 - keto - 21 - phosphato-2'-(4-fluorophenyl)-pregn-4-eno-[3,2-c]-pyrazole which may be recrystallized from methanol:ethyl acetate. This product, dissolved in methanol, may be tritrated with aqueous sodium hydroxide to yield the corresponding monosodium and disodium salts.

In a similar fashion, other 21-hydroxy compounds of the present invention are converted to the corresponding 21-iodo intermediates via the initial procedure of Example 9 and then to the corresponding 21-phosphates via the procedure of this example.

EXAMPLE 11

Two milliliters of dihydropyran are added to a solution of 1 g. of 6,7-methylene-9α-fluoro-11β,17α,21-trihydroxy-16β-methyl - 20 - keto-2'-(4-fluorophenyl)-pregn-4-eno-[3,2-c]-pyrazole in 15 ml. of benzene. About 1 ml. is removed by distillation to remove moisture and 0.4 g. of p-toluenesulfonic acid is added to the cooled solution.

This mixture is allowed to stand at room temperature for four days and is then washed with aqueous sodium carbonate solution and water, dried, and evaporated. The residue is chromatographed on neutral alumina, eluting with hexane, to yield 6,7-methylene-9α-fluoro-11β,17α-dihydroxy-16β-methyl - 20 - keto - 21 - tetrahydropyran-2-yloxy-2'-(4-fluorophenyl)-pregn - 4 - eno-[3,2-c]-pyrazole which is recrystallized from pentane.

Other 21-hydroxy compounds of the present invention are converted to the corresponding 21-tetrahydropyran-2-yloxy derivatives via the method of this example. Likewise, the corresponding 21-tetrahydrofuran-2-yloxy derivatives of the present invention are prepared through use of dihydrofuran in the above procedure.

EXAMPLE 12

To a mixture of 1 g. of 6,7-difluoromethylene-9α-fluoro-11β,17α,21-trihydroxy - 16β - methyl-20-keto-2'-(4-fluorophenyl)-pregn-4-eno-[3,2-c]-pyrazole in 10 ml. of dry dimethylformamide and 2.0 ml. of methyl orthovalerate is added and 10 mg. of p-toluenesulfonic acid. The reaction mixture is refluxed for 30 minutes, cooled, neutralized with aqueous sodium bicarbonate solution, and extracted with benzene. These extracts are dried and evaporated to dryness to yield 6,7-difluoromethylene-9α-fluoro - 11β - hydroxy - 16β - methyl-17α,21-(1-methoxy-pent - 1,1 - ylidenedioxy)-20-keto-2'-(4-fluorophenyl)-pregn-4-eno-[3,2-c]-pyrazole which may be further purified through recrystallization from acetone:hexane and separated into its diastereoisomers via chromatography over alumina.

In a like manner, other orthoesters, such as methyl orthopropionate, methyl orthocaproate, ethyl orthoformate, and the like, may be utilized in the foregoing procedure. Similarly, other compounds of the present invention may be substituted for the particular starting material recited above.

EXAMPLE 13

To an ethereal solution of 6,7-difluoromethylene-9α-fluoro - 11β - hydroxy - 16β - methyl-17α,21-(1-methoxy-pent - 1,1 - ylidenedioxy)-20-keto-2'-(4-fluorophenyl)-pregn-4-eno-[3,2-c]-pyrazole are added a few drops of 10% hydrochloric acid. The mixture is allowed to stand at room temperature for five hours and is then washed with water, dried over sodium sulfate, and evaporated to dryness to yield 6,7-difluoromethylene-9α-fluoro-11β,21-dihydroxy-16β-methyl - 17α - pentanoyloxy-20-keto-2'-(4-fluorophenyl)-pregn-4-eno-[3,2-c]-pyrazole which is further purified through recrystallization from acetone:hexane.

By forming the methyl orthovalerate ester of 6,7-methylene-9α-fluoro-11β,17α,21-trihydroxy - 16β - methyl-20-keto-2'-(4-fluorophenyl)-pregn - 4 - eno-[3,2-c]-pyrazole according to the procedure of Example 12 and subjecting it to the procedure of this example, there is obtained 6,7-methylene - 9α - fluoro-11β,21-dihydroxy-16β-methyl-17α-pentanoyloxy - 20 - keto-2'-(4-fluorophenyl)-pregn-4-eno-[3,2-c]-pyrazole. Likewise, the various other 17α-hydroxy compounds of the present invention are converted to the corresponding 17α-acyloxy derivatives via this route.

EXAMPLE 14

A mixture of 1 g. of 6,7-methylene-6β,9α-difluoro-11β,17α,21-trihydroxy - 16α - methyl-20-keto-2'-(4-fluorophenyl)-pregn-4-eno-[3,2-c]-pyrazole, 4 ml. of pyridine, and 2 ml. of acetic anhydride is allowed to stand at room temperature for 15 hours. The mixture is then poured into ice water and the solid which forms is collected by filtration, washed with water, and dried to yield 6,7-methylene-6β,9α-difluoro-11β,17α-dihydroxy - 16α - methyl-20-keto-21-acetoxy-2'-(4-fluorophenyl)pregn - 4 - eno-[3,2-c]-pyrazole which may be further purified through recrystallization from acetone:hexane.

In a similar fashion, by utilizing anhydrides of other hydrocarbon carboxylic acids of less than 12 carbon atoms in place of acetic anhydride, the corresponding 21-acyloxy derivatives are obtained. The various other 21-hydroxy compounds of the present invention may be similarly prepared. In the case of those compounds which are unsubstituted in the 2'-position, there is obtained according to the above procedure the N-acetyl-21-acetoxy derivative. This when refluxed in 80% acetic acid for 90 minutes, poured into water, and extracted with ethyl acetate yields the corresponding 2'-unsubstituted-21-acetoxy derivatives.

Thus also prepared are 6α,7α-difluoromethylene-16α,17α-isopropylidenedioxy - 20 - keto-21-acetoxy-2'-phenyl-pregn-4-eno-[3,2-c]-pyrazole, M.P. 172–175° C., $[\alpha]_D = +53°$, 6α,7α-difluoromethylene-16α,17α-isopropylidenedioxy-20-keto-21-acetoxy - 2' - (4 - fluorophenyl) - pregn-4-eno-[3,2-c]-pyrazole, M.P. 130–155° C., and 6α,7α-difluoromethylene - 11β-hydroxy-16α,17α-isopropylidenedioxy - 20 - keto-21-acetoxy-2'-phenylpregn-4-eno-[3,2-c]-pyrazole, M.P. 264–267° C., $[\alpha]_D = +79°$, as well as the corresponding 6β,7β derivatives thereof.

EXAMPLE 15

A mixture of 2 g. of 6,7-difluoromethylene-9α-fluoro-11β,17α,21-trihydroxy-16α-methyl-20-keto-2' - (4-fluorophenyl)-pregn-4-eno-[3,2-c]-pyrazole in 8 ml. of pyridine and 4 ml. of trimethylacetyl chloride is heated at steam bath temperatures for one hour. The mixture is then poured into ice water. The solid which forms is collected by filtration, washed with water, and dried to yield 6α,7α-difluoromethylene - 9α - fluoro - 11β,17α-dihydroxy-16α-methyl-20-keto-21-trimethylacetoxy-2' - (4-fluorophenyl)-pregn-4-eno-[3,2-c]-pyrazole and the corresponding 6β,7β compound which may be recrystallized from methylene chloride:hexane.

Similarly, there are obtained from the corresponding starting materials 6,7-methylene-9α-fluoro-11β,17α-dihydroxy - 16α-methyl - 20 - keto-21-trimethylacetoxy-2'-(4-fluorophenyl) - pregn-4-eno-[3,2-c]-pyrazole; 6,7-methylene - 9α - fluoro - 11β,17α-dihydroxy-16α-methyl-20-keto-21-trimethylacetoxy - 2' - phenylpregn-4-eno-[3,2-c]-pyrazole; 6α,7α - difluoromethylene-11β,17α-dihydroxy-16α-methyl-20-keto-21-trimethylacetoxy-2'-(4 - fluorophenyl)-pregn-4-eno-[3,2-c]-pyrazole, M.P. 238–244° C., [α]$_D$= +32°; 6α,7α-difluoromethylene-17α-hydroxy-16α-methyl-20-keto-21-trimethylacetoxy-2'-(4 - fluorophenyl)-pregn-4-eno-[3,2-c]-pyrazole, M.P. 124–127° C., [α]$_D$=+23°; 6α,7α - difluoromethylene-11β,17α-dihydroxy-16α-methyl-20 - keto - 21 - trimethylacetoxy - 2' - phenylpregn-4-eno-[3,2-c]-pyrazole, M.P. 239–244° C.; 6α,7α-difluoromethylene-17α-hydroxy-16α-methyl-20-keto - 21-trimethylacetoxy-2'-phenylpregn-4-eno - [3,2-c] - pyrazole, M.P. 208–210° C., [α]$_D$=+25°; as well as the corresponding 6β,7β derivative thereof, and the like esters of the various other compounds of the present invention.

EXAMPLE 16

The procedure set forth in the second paragraph of Example 1 is repeated with the exception of using the appropriate quantity of sodium dichlorofluoroacetate in lieu of sodium chlorodifluoroacetate to yield the corresponding 6α,7α - chlorofluoromethylene-16α-methyl-17α,20;20,21 - bismethylenedioxypregn-4-en-11β-ol-3-one and the corresponding 6β,7β-chlorofluoromethylene isomer.

Similarly, the other Δ$^{4,6}$-dienes of this invention are thus treated to furnish the corresponding 6,7-chlorofluoromethylene compounds.

EXAMPLE 17

A mixture of 1 g. of 6,7-difluoromethylene-16α-methyl-11β,17α,21-trihydroxy-20-keto-2'-(4-fluorophenyl)-pregn-4-eno-[3,2-c]-pyrazole in 15 ml. of dry chloroform which has been previously washed with concentrated sulfuric acid, and 15 ml. of a 0.7 N solution of hydrogen chloride in benzyl alcohol is allowed to stand for five days with occasional shaking. At the end of this period, the solvents are removed by steam distillation and the residue extracted with ether. The ethereal extracts are washed well with water, dried, and evaporated.

A solution of 1 g. of this material in 20 ml. of ethanol, previously distilled over Raney nickel, is hydrogenated with 0.25 g. of a 10% palladium-on-charcoal catalyst for 24 hours. The catalyst is then removed by filtration through Celite diatomaceous earth and the filtrate evaporated to dryness to yield 6,7 - difluoromethylene-16α-methyl - 11β,21 - dihydroxy-20-keto-2'-(4-fluorophenyl)-pregn-4-eno-[3,2-c]-pyrazole which may be further purified by recrystallization from acetone:hexane.

Among the other corresponding steroids which are so prepared are the following:

6,7-difluoromethylene-9α-fluoro-16α-methyl-11β,21-dihydroxy-20-keto-2'-(4-fluorophenyl)-pregn-4-eno-[3,2-c]-pyrazole;

6,7-difluoromethylene-16α-methyl-21-hydroxy-20-keto-2'-(4-fluorophenyl)-pregn-4-eno-[3,2-c]-pyrazole;

6,7-methylene-16α-methyl-11β,21-dihydroxy-20-keto-2'-(4-fluorophenyl)-pregn-4-eno-[3,2-c]-pyrazole;

6,7-methylene-9α-fluoro-16α-methyl-11β,21-dihydroxy-20-keto-2'-(4-fluorophenyl)-pregn-4-eno-[3,2-c]-pyrazole; and 6,7-methylene-16α-methyl-21-hydroxy-20-keto-2'-(4-fluorophenyl)-pregn-4-eno-[3,2-c]-pyrazole.

What is claimed is:

1. Compounds of the formula:

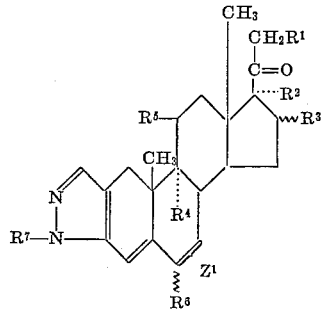

wherein $R^1$ is hydrogen, hydroxy, fluoro, chloro, phosphato, tetrahydropyran - 2 - yloxy, tetrahydrofuran-2-yloxy, or a hydrocarbon carboxylic acyloxy group of less than 12 carbon atoms;

$R^2$ is hydrogen, hydroxy, a hydrocarbon carboxylic acyloxy group of less than 12 carbon atoms or, when taken together with $R^1$, one of groups

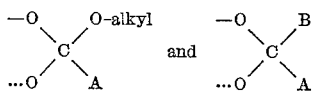

in which A is hydrogen or alkyl of up to 8 carbon atoms and B is hydrogen, or alkyl or aryl of up to 8 carbon atoms;

$R^3$ is hydrogen, methylene, α-methyl, β-methyl, α-chloro, α-fluoro, α-hydroxy, or an α-hydrocarbon carboxylic acyloxy group of less than 12 carbon atoms or, when taken together with $R_2$, the group

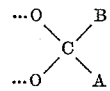

in which A is hydrogen or alkyl of up to 8 carbon atoms and B is hydrogen, or alkyl or aryl of up to 8 carbon atoms;

$R^4$ is hydrogen, chloro, or fluoro;

$R^5$ is hydrogen, hydroxy, keto, or chloro, $R^4$ and $R^5$ being the same when $R^5$ is hydrogen or chloro;

$R^6$ is hydrogen, chloro, fluoro, or methyl;

$R^7$ is hydrogen, phenyl, chlorophenyl, fluorophenyl, methoxyphenyl, or methylphenyl; and $Z^1$ is the group

in which each of X and Y is hydrogen, chloro, or fluoro.

2. Compounds according to claim 1 wherein $R^1$ is hydroxy or fluoro;

$R^2$ is hydrogen, hydroxy, or a hydrocarbon carboxylic acyloxy group of less than 12 carbon atoms;

$R^3$ is α-methyl or, when taken together with $R^2$, the group

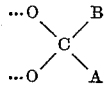

in which A is hydrogen or alkyl of up to 8 carbon atoms and B is hydrogen, or alkyl or aryl of up to 8 carbon atoms;

$R^4$ is hydrogen or fluoro;

$R^5$ is hydrogen or hydroxy;

$R^6$ is hydrogen, chloro, fluoro, or methyl;

$R^7$ is hydrogen, phenyl, chlorophenyl, or fluorophenyl, and $Z^1$ is the group

in which each of X and Y is hydrogen, chloro, or fluoro.

3. A compound according to claim 2 wherein $R^1$ is hydroxy, $R^2$ is hydrogen, $R^3$ is α-methyl, $R^4$ is hydrogen, $R^5$ is hydroxy, $R^6$ is hydrogen, $R^7$ is fluorophenyl, and $Z^1$ is the group

4. A compound according to claim 2 wherein $R^1$ is hydroxy, $R^2$ is hydroxy, $R^3$ is a α-methyl, $R^4$ is hydrogen, $R^5$ is hydroxy, $R^6$ is hydrogen, $R^7$ is fluorophenyl, and $Z^1$ is the group

5. A compound according to claim 2 wherein $R^1$ is hydroxy, $R^2$ is hydrogen, $R^3$ is α-methyl, $R^4$ is fluoro, $R^5$ is hydroxy, $R^6$ is hydrogen, $R^7$ is fluorophenyl, and $Z^1$ is the group

6. A compound according to claim 2 wherein $R^1$ is hydroxy, $R^2$ is hydroxy, $R^3$ is α-methyl, $R^4$ is fluoro, $R^5$ is hydroxy, $R^6$ is hydrogen, $R^7$ is fluorophenyl, and $Z^1$ is the group

7. A compound according to claim 2 wherein $R^1$ is hydroxy, $R^2$ and $R^3$, taken together, is isopropylidenedioxy, $R^4$ is fluoro, $R^5$ is hydroxy, $R^6$ is hydrogen, $R^7$ is fluorophenyl, and $Z^1$ is the group

8. A compound according to claim 2 wherein $R^1$ is hydroxy, $R^2$ is hydrogen, $R^3$ is α-methyl, $R^4$ is hydrogen, $R^5$ is hydrogen, $R^6$ is hydrogen, $R^7$ is fluorophenyl, and $Z^1$ is the group

9. A compound according to claim 2 wherein $R^1$ is hydroxy, $R^2$ is hydroxy, $R^3$ is α-methyl, $R^4$ is hydrogen, $R^5$ is hydroxy, $R^6$ is hydrogen, $R^7$ is fluorophenyl, and $Z^1$ is the group

10. A compound according to claim 2 wherein $R^1$ is hydroxy, $R^2$ is hydroxy, $R^3$ is α-methyl, $R^4$ is hydrogen, $R^5$ is hydroxy, $R^6$ is hydrogen, $R^7$ is phenyl, and $Z^1$ is the group

11. A compound according to claim 2 wherein $R^1$ is hydroxy, $R^2$ is hydroxy, $R^3$ is α-methyl, $R^4$ is fluoro, $R^5$ is hydroxy, $R^6$ is hydrogen, $R^7$ is phenyl, and $Z^1$ is the group

12. A compound according to claim 2 wherein $R^1$ is hydroxy, $R^2$ is hydrogen, $R^3$ is α-methyl, $R^4$ is hydrogen, $R^5$ is hydroxy, $R^6$ is hydrogen, $R^7$ is fluorophenyl, and $Z^1$ is the group

13. A compound according to claim 2 wherein $R^1$ is hydroxy, $R^2$ is hydrogen, $R^3$ is α-methyl, $R^4$ is hydrogen, $R^5$ is hydroxy, $R^6$ is hydrogen, $R^7$ is fluorophenyl, and $Z^1$ is the group

14. A compound according to claim 2 wherein $R^1$ is hydroxy, $R^2$ is hydrogen, $R^3$ is α-methyl, $R^4$ is fluoro, $R^5$ is hydroxy, $R^6$ is hydrogen, $R^7$ is fluorophenyl, and $Z^1$ is the group

15. A compound according to claim 2 wherein $R^1$ is hydroxy, $R^2$ is hydroxy, $R^3$ is α-methyl, $R^4$ is fluoro, $R^5$ is hydroxy, $R^6$ is hydrogen, $R^7$ is fluorophenyl, and $Z^1$ is the group

16. A compound according to claim 2 wherein $R^1$ is hydroxy, $R^2$ and $R^3$, taken together, is isopropylidenedioxy, $R^4$ is fluoro, $R^5$ is hydroxy, $R^6$ is hydrogen, $R^7$ is fluorophenyl, and $Z^1$ is the group

17. A compound according to claim 2 wherein $R^1$ is hydroxy, $R^2$ is hydrogen, $R^3$ is α-methyl, $R^4$ is hydrogen, $R^5$ is hydrogen, $R^6$ is hydrogen, $R^7$ is fluorophenyl, and $Z^1$ is the group

18. A compound according to claim 2 wherein $R^1$ is hydroxy, $R^2$ is hydrogen, $R^3$ is α-methyl, $R^4$ is hydrogen, $R^5$ is hydrogen, $R^6$ is hydrogen, $R^7$ is fluorophenyl, and $Z^1$ is the group

19. A compound according to claim 2 wherein $R^1$ is hydroxy, $R^2$ is hydroxy, $R^3$ is α-methyl, $R^4$ is hydrogen, $R^5$ is hydroxy, $R^6$ is hydrogen, $R^7$ is phenyl, and $Z^1$ is the group

20. A compound according to claim 2 wherein $R^1$ is hydroxy, $R^2$ is hydroxy, $R^3$ is α-methyl, $R^4$ is fluoro, $R^5$ is hydroxy, $R^6$ is hydrogen, $R^7$ is phenyl, and $Z^1$ is the group

References Cited

UNITED STATES PATENTS 3,325,480   6/1967   De Ruggieri et al. __ 260—239.5

ELBERT L. ROBERTS, *Primary Examiner*.

H. FRENCH, *Assistant Examiner*.

UNITED STATES PATENT OFFICE
CERTIFICATE OF CORRECTION

Patent No. 3,364,203                    January 16, 1968

Colin C. Beard et al.

It is hereby certified that error appears in the above numbered patent requiring correction and that the said Letters Patent should read as corrected below.

Column 1, lines 42 to 52, the formula should appear as shown below instead of as in the patent:

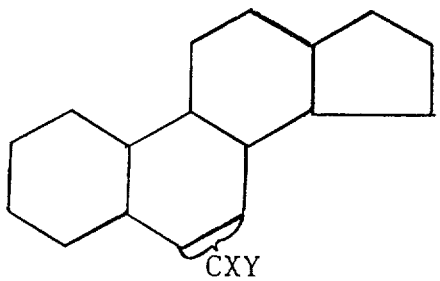

column 2, line 6, for "R" read -- $R^1$ --; column 6, line 22, for "is" read -- as --; line 46, for "where" read -- when --; column 10, line 38, for "6,9α-difluoro" read -- 9α-fluoro --; line 41, for "11β,17α,2" read -- 11β,17α,21 --; column 16, lines 58 and 59, for "sequences" read -- sequence --; column 17, line 3, for "difluoromehylene" read -- difluoromethylene --; line 14, for "mehanol" read -- methanol --; column 19, line 26, for "161" read -- 16- --; column 21, line 45, for "2,4" read -- 2,3 --; column 22, line 30, for "11α,17α,21" read -- 11β,17α,21 --; line 33, for "11β-17α,21" read -- 11β,17α,21 --; column 24, line 36, for "hexene" read -- hexane --; line 46, for "2,20" read -- 3,20 --; column 26, line 69, for "3,4" read -- 3.4 --.

Signed and sealed this 8th day of April 1969.

(SEAL)
Attest:

EDWARD M. FLETCHER, JR.                EDWARD J. BRENNER
Attesting Officer                          Commissioner of Patents